United States Patent
Cafmeyer et al.

(10) Patent No.: US 10,883,067 B2
(45) Date of Patent: Jan. 5, 2021

(54) DIRECT ALKOXYLATION OF BIO-OIL

(71) Applicant: Battelle Memorial Institute, Columbus, OH (US)

(72) Inventors: Jeffrey T. Cafmeyer, Columbus, OH (US); Daniel Garbark, Blacklick, OH (US); Mark J. Perry, Hilliard, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 15/619,707

(22) Filed: Jun. 12, 2017

(65) Prior Publication Data

US 2017/0355927 A1    Dec. 14, 2017

Related U.S. Application Data

(60) Provisional application No. 62/348,863, filed on Jun. 11, 2016.

(51) Int. Cl.
*C08G 18/48* (2006.01)
*C11C 3/00* (2006.01)
(Continued)

(52) U.S. Cl.
CPC ............... *C11C 3/006* (2013.01); *C08G 8/04* (2013.01); *C08G 18/14* (2013.01); *C08G 18/161* (2013.01); *C08G 18/1833* (2013.01); *C08G 18/2081* (2013.01); *C08G 18/48* (2013.01); *C08G 18/4804* (2013.01); *C08G 18/4829* (2013.01); *C08G 18/4891* (2013.01);
(Continued)

(58) Field of Classification Search
CPC ................ C08G 18/48; C08G 18/4891; C08G 18/6677; C08G 18/32; C08G 18/14
See application file for complete search history.

(56) References Cited

U.S. PATENT DOCUMENTS 3,468,822 A * 9/1969 Doerge ............. C08G 18/4081
106/218
2006/0229375 A1* 10/2006 Hsiao ................. C08G 18/4866
521/172
(Continued)

FOREIGN PATENT DOCUMENTS

| CN | 101125919 B | * | 5/2012 | |
| WO | WO-2014201185 A2 | * | 12/2014 | ......... C08G 65/2603 |
| WO | WO-2015191936 A1 | * | 12/2015 | ......... C08G 18/3206 |

OTHER PUBLICATIONS

"Processing and properties of rigid polyurethane foams based on bio-oils from microwave-assisted pyrolysis of corn stover." Wu et al. Int J Agric & Biol Eng. vol. 2 No. 1, Mar. 2009.*
(Continued)

*Primary Examiner* — Michael L Leonard
(74) *Attorney, Agent, or Firm* — Benesch, Friedlander, Coplan & Aronoff LLP

(57) ABSTRACT

An alkoxylated bio-oil composition is provided. The alkoxylated bio-oil composition may include an alkoxylated bio-oil prepared from an alkoxylation of dewatered bio-oil. A method for preparing an alkoxylated bio-oil composition is provided. A copolymer composition is provided. The copolymer composition may include an alkoxylated bio-oil copolymer unit. A method for preparing a copolymer composition is provided.

16 Claims, 6 Drawing Sheets

(51) Int. Cl.
*C08G 18/66* (2006.01)
*C08G 18/76* (2006.01)
*C08G 18/18* (2006.01)
*C08G 65/26* (2006.01)
*C08G 18/16* (2006.01)
*C11B 3/00* (2006.01)
*C08G 18/20* (2006.01)
*C08G 8/04* (2006.01)
*C08G 18/08* (2006.01)
*C08G 101/00* (2006.01)

(52) U.S. Cl.
CPC ..... *C08G 18/6677* (2013.01); *C08G 18/7664* (2013.01); *C08G 65/2609* (2013.01); *C11B 3/006* (2013.01); *C08G 2101/00* (2013.01); *C08G 2101/005* (2013.01); *C08G 2101/0025* (2013.01); *C08G 2101/0033* (2013.01); *C08G 2101/0041* (2013.01); *C08G 2101/0083* (2013.01); *C08G 2120/00* (2013.01); *C08G 2190/00* (2013.01)

(56) References Cited

U.S. PATENT DOCUMENTS

| | | | |
|---|---|---|---|
| 2007/0037953 A1* | 2/2007 | Geiger | C07D 303/42 528/44 |
| 2009/0127915 A1* | 5/2009 | Nozawa | C08G 18/4072 297/452.48 |
| 2009/0170972 A1* | 7/2009 | Sonney | C08G 18/36 521/88 |
| 2010/0105855 A1* | 4/2010 | Reese | B01D 63/023 528/76 |
| 2012/0161060 A1* | 6/2012 | Homan | B27K 3/0214 252/62 |

OTHER PUBLICATIONS

CN-101125919_May 2012_English.*
Pyrolysis of Wood/Biomass for Bio-oil: A Critical Review. Mohan et al. Energy and Fuels 2006, 20, 848-889.*
Ari et al., J Ethnobiol Ethnomed., 10:29 (2014).
Zhang et al., Molecules, 24, 2250 (2019).

* cited by examiner

| Bio Oil Polyol from Direct Reaction of Dewatered Bio Oil with 30%wt Propylene Oxide | | | | | | | |
|---|---|---|---|---|---|---|---|
| | KF Before PO | Viscosity, P 40C | 31P AV | 31P HV | Compression (psi) | Density | Corrected Deviation from Standard |
| Dewatered Lite Oil | 3.02 | 3.2 | 3.1 | 584 | NA | NA | NA |
| Dewatered Heavy+Lite | 1.86 | 12 | 0 | 507 | 100 | 1.63 | Semi-Rigid |
| Dewatered Heavy Oil | 1.55 | 49 | 0 | 415 | 175 | 1.85 | 66 |
| Dewatered Bio Oil | NA | 342 | 0 | 242 | 213 | 2.43 | 58 |

FIG. 3

| %Polyol Replacement | 50 | 0 |
|---|---|---|
| Huntsman SG-360 Petroleum Polyol | 25 | 50 |
| Battelle F101 | 25 | 0 |
| WATER | 2.25 | 2.25 |
| Air Products Dabco DC193 | 2 | 2 |
| Air Products Dabco 33LV | 0.5 | 0.5 |
| Momentive NIAX A1 | 0.16 | 0.16 |
| BASF Lupranate M20S (NCO) | 78.87 | 82.55 |
| Total= | 133.78 | 137.46 |

FIG. 4

| %Polyol Replacement | 50 | 0 |
|---|---|---|
| Petroleum Polyol | 25 | 50 |
| Battelle F101 | 25 | 0 |
| WATER | 2.25 | 2.25 |
| DC193 | 2 | 2 |
| 33LV | 0.5 | 0.5 |
| NIAXA1 | 0.16 | 0.16 |
| M20S | 78.87 | 82.55 |
| Total= | 133.78 | 137.46 |
| Foam Profile | | |
| Mix, s | 9 | 10 |
| Cream, s | 10 | 12 |
| Gel, s | 40 | 65 |
| Rise, s | 70 | 85 |
| Tack Free, s | 115 | 215 |
| Density | 1.88 | 1.85 |
| Max Load, psi | 111.0±9.9 | 96.6±10.9 |

FIG. 5

DIRECT ALKOXYLATION OF BIO-OIL

CROSS-REFERENCE TO RELATED APPLICATIONS

This application claims priority from U.S. Provisional Patent Application No. 62/348,863 filed on Jun. 11, 2016, the entire contents of which are incorporated herein by reference.

BACKGROUND

Biomass such as, for example, lignocellulosic substances (e.g., wood), may be subjected to pyrolysis to create a hot pyrolysis vapor. Bio-oil may be extracted from the hot pyrolysis vapor. Bio-oil from pyrolysis of wood may contain a mixture of water, organic acids, alcohols, aldehydes, phenols, and sugar derivatives. The production and availability of bio-oil and bio-oil derivatives may provide a ready starting material for many chemical transformations.

The present application appreciates that developing bio-oil and bio-oil derivatives may be a challenging endeavor.

SUMMARY

In one embodiment, a method for preparing an alkoxylated bio-oil composition is provided. The method may include providing a dewatered bio-oil. The method may include contacting the dewatered bio-oil to an alkoxylation reagent. The method may include reaction conditions effective to form an alkoxylated bio-oil.

In one embodiment, an alkoxylated bio-oil composition is provided. The alkoxylated bio-oil composition may include an alkoxylated bio-oil. The alkoxylated bio-oil may be derived from a dewatered bio-oil. The alkoxylated bio-oil composition may include a free alkylene glycol in less than about 40 wt % compared to an amount of the alkoxylated bio-oil.

In one embodiment, a method for preparing a copolymer composition is provided. The method may include providing a polymerization precursor mixture. The polymerization precursor mixture may include a crosslinking reagent. The crosslinking reagent may be configured to form a copolymer in combination with an alkoxylated bio-oil. The alkoxylated bio-oil composition may include an alkoxylated bio-oil. The method may include reacting an alkoxylated bio-oil composition with the polymerization precursor mixture. The alkoxylated bio-oil composition may include the alkoxylated bio-oil. The method may include reaction conditions effective to form the copolymer composition.

In one embodiment, a copolymer composition is provided. The copolymer composition may include a copolymer. The copolymer may include an alkoxylated bio-oil unit. The alkoxylated bio-oil unit may be derived from an alkoxylated bio-oil composition including an alkoxylated bio-oil. The copolymer may include a cross-linking unit. The cross-linking unit may be derived from a crosslinking reagent. The cross-linking unit may be effective to crosslink more than one alkoxylated bio-oil unit to form the copolymer.

BRIEF DESCRIPTION OF THE DRAWINGS

The accompanying figures, which are incorporated in and constitute a part of the specification, illustrate example methods and compositions, and are used merely to illustrate example embodiments.

FIG. 3 is a table illustrating resulting properties of alkoxylated bio-oils from direct alkoxylation of dewatered bio-oils with propylene glycol; and resulting properties of polyurethane foams prepared from the alkoxylated bio-oils.

FIG. 4 is a table illustrating a reference formulation for the preparation of polyurethane foams.

FIG. 5 is a table illustrating a general formulation for the preparation of polyurethane foams.

DETAILED DESCRIPTION

Bio-oil produced from the pyrolysis of wood or other lignocellulosic biomass may contain many components, including water, alcohols, organic acids, phenols, and sugars. Bio-oil produced by pyrolysis may include bio-oil polyols. Functionalized bio-oils may provide added value, for example, as replacement polyol reagents in polymerizations for forming polyesters, polyurethanes, copolymers, phenolic resins, hot melt adhesive compositions, and the like. Producing functionalized bio-oils may include alkoxylation of bio oils to provide alkoxylated bio-oils. It may be desirable to avoid water in alkoxylation reactions, as the water may react with alkoxylation reagents, e.g., propylene oxide, and lead to formation of undesirable corresponding free alkylene glycols, e.g., mono- or polyalkylene glycols. The presence of free alkylene glycols in alkoxylated bio-oil compositions may introduce obstacles in generating materials with desired properties.

Figure 1:
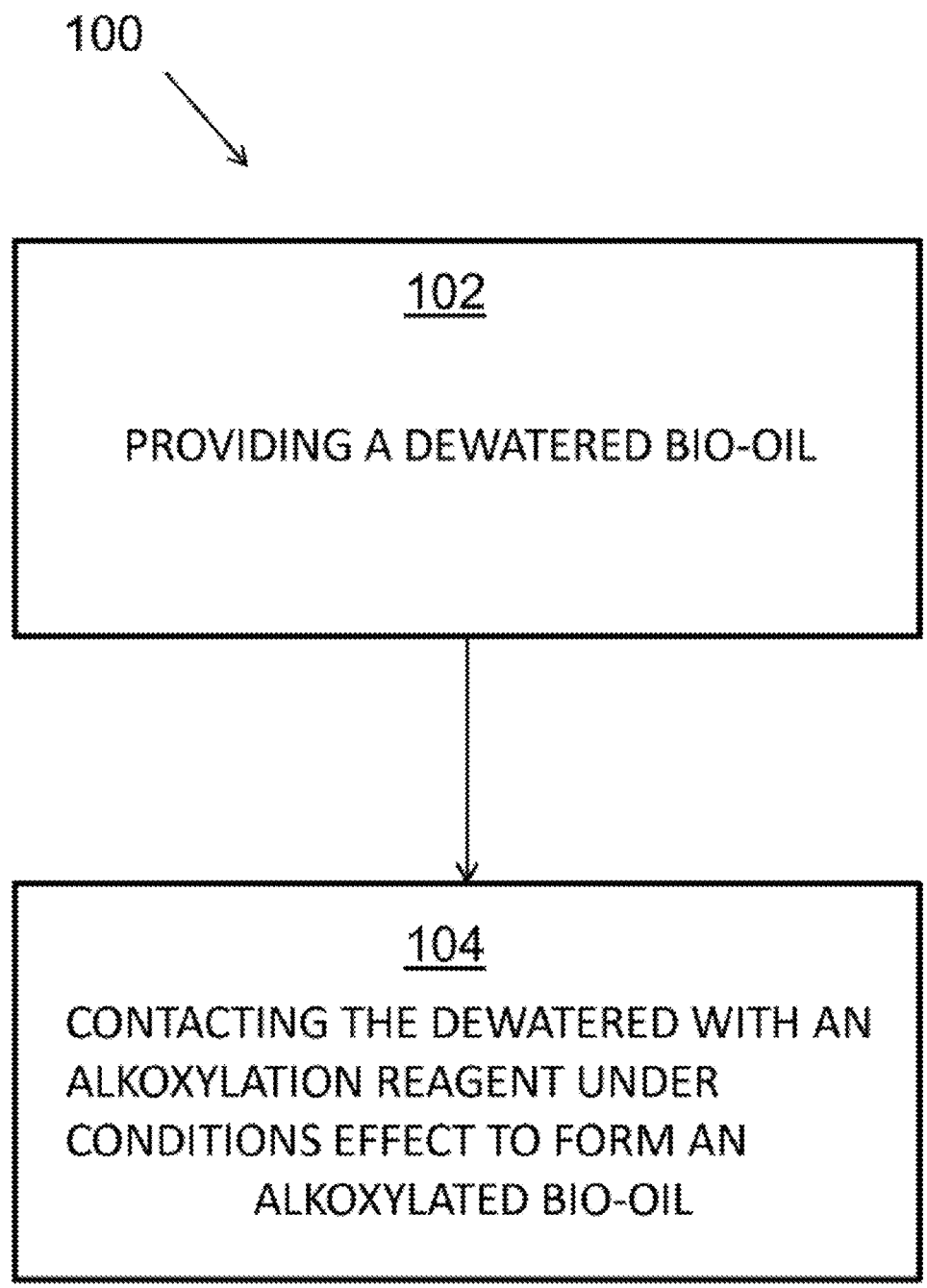
FIG. 1 is a flow diagram illustrating an example method for preparing an alkoxylated bio-oil composition.

FIG. 1 is a flow diagram illustrating an example method 100 for preparing an alkoxylated bio-oil composition.

In various embodiments, method 100 may include 102 providing a dewatered bio-oil. Method 100 may include 104 contacting the dewatered bio-oil to an alkoxylation reagent. Method 100 may include reaction conditions effective to form an alkoxylated bio-oil.

Method 100 may include the dewatered bio-oil produced from a bio-oil. The bio-oil may be produced from pyrolysis of a biomass. The bio-oil may be produced from catalytic pyrolysis of a biomass. The biomass may originate from wood or other lignocellulosic-containing biomass.

The dewatered bio-oil may be produced by a dewatering step of a bio-oil. The bio-oil may be produced by pyrolysis of biomass. Additionally or alternatively, the bio-oil may be a catalytic bio-oil produced by catalytic pyrolysis of biomass. Biomass may include, for example, lignin, cellulose, or lignocelluloses or mixtures thereof.

The dewatering step may include heating a bio-oil containing water to a temperature of at least 100° C. (distillation). The dewatering step may include heating a bio-oil containing water to a temperature less than 100° C. under reduced pressure (vacuum distillation). The dewatering step may further include condensing a water vapor in a container separate from the bio-oil in order to provide the dewatered bio-oil. The dewatering step may include cooling a bio-oil containing water to a temperature less than 0° C. under reduced pressure (freeze drying).

The dewatering step may include contacting a bio-oil containing water with a composition. The composition may be effective to form an azeotrope with water. The composition may include, for example, benzene, toluene, ethanol, and the like. The dewatering step may include heating the bio-oil containing water and the composition to a temperature effective to co-distill the water and the composition. The dewatering step may include heating the bio-oil containing water and the composition to a temperature under a reduced pressure effective to co-distill the water and the composition. The dewatering step may further include condensing a water vapor and a composition vapor in a container separate from the bio-oil in order to provide the dewatered bio-oil.

The dewatering step may include allowing the bio-oil containing water to stand open to the atmosphere (evaporation). The dewatering step may further include heating the bio-oil containing water while being open to the atmosphere. The dewatering step may further include passing a stream of gas over the surface of the bio-oil containing water to aid evaporation. The dewatering step may further include bubbling a gas through the bio-oil containing water to aid evaporation. The gas may include, for example, air, nitrogen, argon, and the like.

The dewatering step may include immersing an adsorbent medium in the bio-oil containing water for a period of time and further filtering the bio-oil to remove the adsorbent medium. The dewatering step may include passing a bio-oil over an adsorbent medium. The dewatering step may include housing the bio-oil containing water in a container including a compartmentalized adsorbent medium chamber separate from the bio-oil containing water. The adsorbent medium may include a desiccant or drying agent, such as sodium sulfate, magnesium sulfate, calcium sulfate, and the like. The adsorbent medium may include molecular sieves.

The dewatering step may include separating water from a bio-oil by centrifugal force (centrifugation). The dewatered bio-oil may further be removed by decantation.

The dewatered bio-oil may be produced by a dewatering step of a bio-oil. The dewatering step may include washing the bio-oil containing water with a saturated aqueous solution of, for example, sodium chloride.

The dewatered bio-oil of method 100 may include an amount of water in less than about 3 wt % compared to an amount of the dewatered bio-oil. The dewatered bio-oil of method 100 may include an amount of water in less than about 2 wt %. The dewatered bio-oil of method 100 may include an amount of water in less than about 1.5 wt %. The dewatered bio-oil of method 100 may include an amount of water in wt % of less than about one or more of: 0.5, 0.8, 1.0, 1.2, 1.4, 1.6, 1.8, 2.0, 2.2, 2.4, 2.6, 2.8, 3.0, 3.2, and 3.5. The dewatered bio-oil of method 100 may include an amount of water in wt % between any of the preceding values, for example, between about 1.4 and about 1.6, or between about 1.8 and about 2.4. The dewatered bio-oil of method 100 may include an amount of water in more than about 10 wt %. The dewatered bio-oil of method 100 may include an amount of water up to about 30 wt %. The dewatered bio-oil of method 100 may include an amount of water in wt % of less than about one or more of: 30, 25, 20, 15, 10, 5, 4, 3, 2, and 1. The dewatered bio-oil of method 100 may include an amount of water in wt % between any of the preceding values, for example, between about 3 and about 4, or between about 5 and about 15. The percentage of water present in the dewatered bio-oil may be determined by Karl Fischer (KF) titration.

The alkoxylation reagent of method 100 may include an epoxide, commonly known as an oxirane or an alkylene oxide. The alkoxylation reagent may include ethylene oxide. The alkoxylation reagent may include ethylene oxide substituted with a linear or branched $C_1$-$C_6$ alkyl, such as propylene oxide. The alkoxylation reagent may include ethylene oxide substituted with a $C_3$-$C_6$ cycloalkyl group, such as 2-cyclohexyloxirane or 7-oxabicyclo[4.1.0]heptane. The alkoxylation reagent may include ethylene oxide substituted with a $C_4$-$C_{10}$ aryl or heteroaryl group, such as 2-phenyloxirane. The alkoxylation reagent may include one or more of a linear or branched $C_1$-$C_6$ alkyl, a $C_3$-$C_6$ cycloalkyl group, and a $C_4$-$C_{10}$ aryl or heteroaryl group.

The alkoxylation reagent of method 100 may include a cyclic carbonate. The cyclic carbonate may include ethylene carbonate. The cyclic carbonate may include trimethylene carbonate. The cyclic carbonate may be substituted with a linear or branched $C_1$-$C_6$ alkyl, such as propylene carbonate. The cyclic carbonate may be substituted with a $C_3$-$C_6$ cycloalkyl group. The cyclic carbonate may be substituted with a $C_4$-$C_{10}$ aryl or heteroaryl group. The cyclic carbonate may include one or more of a linear or branched $C_1$-$C_6$ alkyl, a $C_3$-$C_6$ cycloalkyl group, and a $C_4$-$C_{10}$ aryl or heteroaryl group.

The alkoxylation reagent in method 100 may be present in an amount greater than about 10 wt % compared to an amount of dewatered bio-oil. The alkoxylation reagent in method 100 may be present in an amount less than about 50 wt % compared to an amount of dewatered bio-oil. The alkoxylation reagent in method 100 may be present in an amount in wt % compared to an amount of dewatered bio-oil of at least about one or more of: 1, 2, 3, 4, 5, 6, 7, 8, 9, 10, 15, 20, 25, 30, 35, 40, 45, 50, 55, 60, 65, 70, 75, 80, 85, 90, 95, and 100, or a range between any two of the preceding values, for example, between about 5% and about 70%. The alkoxylation reagent in method 100 may be present in an amount in wt % compared to an amount of dewatered bio-oil between any of the preceding values, for example, between about 25 and about 45, or between about 10 and about 30. The alkoxylation reagent in method 100 may be present in about 45 wt % compared to the amount of dewatered bio-oil. The alkoxylation reagent in method 100 may be present in an amount greater than 50 wt % compared to an amount of dewatered bio-oil. The alkoxylation reagent in method 100 may be present in an amount greater than 100 wt % compared to an amount of dewatered bio-oil.

Method 100 may include reaction conditions including the presence of the promoter. The promoter may include a base. The base may include an alkali metal hydroxide. The alkali metal hydroxide may include sodium hydroxide, potassium hydroxide, cesium hydroxide, and the like. The promoter may include an alkali metal hydride, such as sodium hydride, potassium hydride, and the like. Alternatively, the promoter may include a Brønsted acid, such as acetic acid, p-toluene sulfonic acid, or the like. The promoter may include a Lewis acid, such as compounds based on boron, aluminum, a lanthanide, or the like.

The promoter may be present in a sub-stoichiometric amount (catalytic). The promoter in method 100 may be present in an amount less than about 1 wt % compared to an amount of dewatered bio-oil. The promoter may be present in an amount in wt % compared to an amount of dewatered bio-oil of at least about one or more of: 0.002, 0.005, 0.008, 0.01, 0.05, 0.1, 0.5, 1.0, 1.5, 2, 3, 4, 5, 7, 10, 15, and 20. The promoter may be present in an amount in wt % compared to an amount of dewatered bio-oil between any of the preceding values, for example, between about 0.002 and about 0.005, or between about 0.05 and about 1.5. The promoter may be present in an amount greater than about 20 wt % compared to an amount of dewatered bio-oil. The promoter may be present in an amount greater than or equal to about 100 wt %.

Method 100 may further include first contacting the dewatered bio-oil with a promoter. Method 100 may include allowing the dewatered bio-oil and the promoter to react for a period of time prior to contacting the dewatered bio-oil with the alkoxylation reagent. Method 100 may further include heating the dewatered bio-oil and the promoter at a temperature in ° C. of one or more of: 25, 30, 35, 40, 45, 50, 55, 60, 65, 70, 75, 80, 85, 90, and 100. Method 100 may include heating the dewatered bio-oil and the promoter at a temperature in ° C. between any of the preceding values, for example, between about 60 and about 70, or between about 90 and about 100. Method 100 may include heating the dewatered bio-oil and the promoter at a temperature greater than 100° C. Method 100 may optionally include heating the dewatered bio-oil and the promoter at a temperature under reduced pressure. Method 100 may include a reduced pressure in torr of at least about one or more of: 700, 650, 600, 550, 500, 450, 400, 350, 300, 250, 200, 150, 100, 50, 25, 10, and 5. Method 100 may include a reduced pressure in Torr between any of the preceding values, for example, between about 150 and about 100, or between about 350 and about 200.

In many embodiments, water may be formed while contacting the dewatered bio-oil to the promoter, for example, if the promoter was an alkali metal hydroxide or Brønstad acid. Method 100 may include continual removal of generated water throughout a reaction between the dewatered bio-oil and the promoter prior to contacting the dewatered bio-oil with the alkoxylation reagent. Method 100 may optionally include condensing a water vapor into a container separate from the dewatered bio-oil and the promoter. In many embodiments, the alkoxylation reagent may be added to the dewatered bio-oil and the promoter after the dewatered bio-oil and the promoter have been in contact for a period of time. In some embodiments, a second charge of promoter may be added to the dewatered bio-oil and the alkoxylation reagent after the dewatered bio-oil and a first charge of the promoter have been in contact for a period of time. In other embodiments, the dewatered bio-oil, the promoter, and the alkoxylation reagent are added at once.

Method 100 may include reaction conditions effective to form the alkoxylated bio-oil. Method 100 may include a reaction temperature of at least about 50° C. Method 100 may include a reaction temperature in ° C. of at least about one or more of: 50, 70, 90, 100, 110, 120, 130, 140, 150, 160, 170, and 180. Method 100 may include a reaction temperature in ° C. between any of the preceding values, for example, between about 110 and about 150, or between about 130 and about 140. Method 100 may include a reaction temperature of less than about 50° C. Method 100 may include a reaction temperature of greater than about 180° C. Method 100 may include a reaction temperature that varies throughout the progress of the reaction, for example, the reaction may begin at a temperature of less than about 25° C. for a period of time, and gradually increase to a temperature of greater than about 100° C.

Method 100 may include reaction conditions effective to form the alkoxylated bio-oil. Method 100 may include a reaction pressure in pounds per square inch of at least about one or more of: 0, 50, 100, 150, 200, 250, 300, 350, 400, 450, 500, 550, and 600. Method 100 may include a reaction pressure in pounds per square inch between any of the preceding values, for example, between about 50 and about 100, or between about 150 and about 300. Method 100 may include an autoclave reactor or a bomb reactor.

Method 100 may include reaction conditions effective to from the alkoxylated bio-oil. Method 100 may include microwave radiation. Method 100 may include use of a microwave reactor.

Method 100 may include reaction conditions effective to form the alkoxylated bio-oil. Method 100 may include a reaction time of at least about 2 h. Method 100 may include a reaction time of at least about 4 h. Method 100 may include a reaction time in minutes of at least about one or more of: 10, 30, 60, 90, 120, 150, 180, 210, 240, 270, and 300. Method 100 may include a reaction time in minutes between any of the preceding values, for example, between about 30 and about 90, or between about 180 and about 240. Method 100 may include a reaction time of greater than 300 min.

Method 100 may include reaction conditions effective to form an alkoxylated bio-oil. Method 100 may include reaction conditions to minimize the formation of a free alkylene glycol. The free alkylene glycol may result from reaction between water and the alkoxylation reagent. Method 100 may include an amount of the free alkylene glycol produced in less than about 10 wt % compared to the amount of alkoxylated bio-oil. Method 100 may include an amount in wt % of the free alkylene glycol produced in less than about one or more of: 2, 3, 4, 5, 6, 7, 8, 9, 10, 12, and 15. Method 100 may include an amount in wt % of the free alkylene glycol produced in less than about one or more of: 5, 10, 15, 20, 25, 30, 35, and 40. Method 100 may include an amount in wt % of the free alkylene glycol produced between any of the preceding values, for example, between about 4 and about 6, or between about 3 and about 5. Method 100 may include an amount in wt % of the free alkylene glycol in less than about 2 wt %.

In various embodiments, an alkoxylated bio-oil composition is provided. The alkoxylated bio-oil composition may include an alkoxylated bio-oil. The alkoxylated bio-oil may be derived from a dewatered bio-oil. The alkoxylated bio-oil composition may include a free alkylene glycol in less than about 40 wt % compared to an amount of the alkoxylated bio-oil. The amount of the free alkylene glycol may be present in the alkoxylated bio-oil composition in an amount in wt % of less than about one or more of: 40, 35, 30, 25, 20, 15, 10, and 5, e.g., less than about 40 wt %. The amount of the free alkylene glycol may be present in the alkoxylated bio-oil composition in an amount in wt % between any two of the preceding values, for example between about 10 and about 15, or between about 10 and about 30. For example, the amount of the free alkylene glycol may be present in the alkoxylated bio-oil composition in less than about 5 wt %. The free alkylene glycol may include mono and poly alkylene glycols. The free alkylene glycol may occur, for example, according to reaction of the alkoxylation reagent with water, with itself, side reactions, and the like.

The alkoxylated bio-oil may include polyalkylene glycol units covalently bound to one or more of: an acid, an alcohol, and a phenol group originated in the dewatered bio-oil. The polyalkylene glycol units may form one or more of: an ester, an ether, and a phenolic ether with the dewatered bio-oil.

The alkoxylated bio-oil composition may include an alkoxylated bio-oil derived from a bio-oil. The bio-oil may be produced by pyrolysis of a biomass. The bio-oil may be produced by catalytic pyrolysis of a biomass. The biomass may originate from wood or other lignocellulosic-containing biomass.

The alkoxylated bio-oil composition may include an alkoxylated bio-oil. The alkoxylated bio-oil may be derived from a dewatered bio-oil. The dewatered bio-oil may include water in less than about 3 wt % compared to the amount of the dewatered bio-oil. The dewatered bio-oil may include water in a wt % of less than about one or more of: 30, 25, 20, 15, 10, 5, 4, 3, 2, and 1. The dewatered bio-oil may include water in a wt % between any of the preceding values, for example, between about 4 and about 10, or between about 3 and about 5.

The dewatered bio-oil used to produce the alkoxylated bio-oil may include water in less than about 3 wt % compared to an amount of dewatered bio-oil. The presence of water in an alkoxylation reaction with bio-oil and an alkoxylating reagent may produce a free alkylene glycol, such as propylene glycol, upon reaction of the water with the alkoxylating reagent, such as propylene oxide. Increasing amounts of the free alkylene glycol may result in an alkoxylated bio-oil composition that is unsuitable for preparing materials, such as polyurethane foams. The alkoxylation of a dewatered bio-oil including water in about 1 wt % may produce a free alkylene glycol in about 3.2 wt %.

The alkoxylated bio-oil may result from a direct alkoxylation of a dewatered bio-oil with an alkoxylation reagent. The term "direct alkoxylation" means alkoxylation of a bio-oil that has not undergone other functionalization reactions after pyrolysis and prior to the direct alkoxylation. Competitive reactions may occur during the direct alkoxylation process, e.g., dehydration, as described herein. A reaction is to the breaking or making of chemical bonds in the compounds within the bio-oil.

The alkoxylation reagent may include an epoxide, commonly known as an oxirane or an alkylene oxide. The alkoxylation reagent may include ethylene oxide. The alkoxylation reagent may include ethylene oxide substituted with a linear or branched $C_1$-$C_6$ alkyl, such as propylene oxide. The alkoxylation reagent may include ethylene oxide substituted with a $C_3$-$C_6$ cycloalkyl group, such as 2-cyclohexyloxirane or 7-oxabicyclo[4.1.0]heptane. The alkoxylation reagent may include ethylene oxide substituted with a $C_4$-$C_{10}$ aryl or heteroaryl group, such as 2-phenyloxirane. The alkoxylation reagent may include one or more of a linear or branched $C_1$-$C_6$ alkyl, a $C_3$-$C_6$ cycloalkyl group, and a $C_4$-$C_{10}$ aryl or heteroaryl group.

The alkoxylation reagent may include a cyclic carbonate. The cyclic carbonate may include ethylene carbonate. The cyclic carbonate may include trimethylene carbonate. The cyclic carbonate may be substituted with a linear or branched $C_1$-$C_6$ alkyl, such as propylene carbonate. The cyclic carbonate may be substituted with a $C_3$-$C_6$ cycloalkyl group. The cyclic carbonate may be substituted with a $C_4$-$C_{10}$ aryl or heteroaryl group. The cyclic carbonate may include one or more of a linear or branched $C_1$-$C_6$ alkyl, a $C_3$-$C_6$ cycloalkyl group, and a $C_4$-$C_{10}$ aryl or heteroaryl group.

The alkoxylation reagent may include one or more of an epoxide and a cyclic carbonate.

The alkoxylated bio-oil composition may be prepared by providing a dewatered bio-oil. The alkoxylated bio-oil composition may be prepared by contacting the dewatered bio-oil with an alkoxylation reagent. The alkoxylated bio-oil composition may be prepared by contacting the dewatered bio-oil with an alkoxylation reagent in the presence of a promoter, such as an alkali metal hydroxide, and the like. The alkoxylated bio-oil composition may be prepared under reaction conditions effective to form the alkoxylated bio-oil composition.

The alkoxylated bio-oil composition may be characterized in comparison to a dewatered bio-oil by one or more of: a reduced viscosity, an increased molecular weight, a lower gel permeation chromatography retention time, a lowered acid value, and a reduced percentage of free hydroxyl groups with respect to molecular weight (hydroxyl value).

The alkoxylated bio-oil composition may be characterized in comparison to a dewatered bio-oil by a reduced viscosity. The reduced viscosity may be greater than about 1%. The reduced viscosity may be less than about one or more of: 100%, 99%, 98%, 97%, 96%, 95%, 94%, 93%, 92%, 91%, 90%, 85%, 80%, 75%, 70%, 65%, 60%, 55%, 50%, 45%, 40%, 35%, 30%, 25%, 20%, 15%, 10%, and 5%. The reduced viscosity of the alkoxylated bio-oil in comparison to a dewatered bio-oil may be a value between any of the preceding values, for example, between about 85% and about 90%, or between about 50% and about 80%.

The alkoxylated bio-oil composition may be characterized in comparison to a dewatered bio-oil by an increased molecular weight. The increased molecular weight may be at least about one or more of: 101%, 102%, 103%, 104%, 105%, 106%, 107%, 108%, 109%, 110%, 115%, 120%, 125%, 130%, 135%, 140%, 145%, 150%, 155%, 160%, 165%, 170%, 175%, 180%, 185%, 190%, 195%, and 200%. The increased molecular weight of the alkoxylated bio-oil in comparison to a dewatered bio-oil may be between any of the preceding values, for example, between about 101% and about 105%, or between about 135% and about 170%. The increased molecular weight of the alkoxylated bio-oil in comparison to a dewatered bio-oil may be greater than 200%.

The alkoxylated bio-oil composition may be characterized in comparison to a dewatered bio-oil by a lower gel permeation chromatography retention time. Since alkoxylation of dewatered bio-oil may produce an alkoxylated bio-oil with increased molecular weight, and thus increased size, the percentage of time spent in the stationary phase of gel permeation chromatography may decrease. The percentage of time an alkoxylated bio-oil spends in the stationary phase of gel permeation chromatography may decrease relative to a dewatered bio-oil in minutes by at least about one or more of: 1, 2, 3, 4, 5, 6, 7, 8, 9, 10, 12, 14, 16, 18, 20, 22, 24, 26, 28, and 30. The percentage of time an alkoxylated bio-oil spends in the stationary phase during gel permeation chromatography may decrease relative to a dewatered bio-oil in minutes between any of the preceding values, for example, between about 1 and about 5, or between about 2 and about 10. The percentage of time an alkoxylated bio-oil spends in the stationary phase during gel permeation chromatography may decrease relative to a dewatered bio-oil by an amount greater than 30 min. The retention times may vary along with variations in flow rate and choice of stationary phase material, for example.

The alkoxylated bio-oil composition may be characterized in comparison to a dewatered bio-oil by a reduced percentage of free hydroxyl groups with respect to molecular weight, i.e., a reduced number of free hydroxyls in a compound per the molecular weight of the compound. The alkoxylated bio-oil composition may be characterized in comparison to a dewatered bio-oil by a reduced hydroxyl value. In other words, a constant number of free hydroxyls and an increasing molecular weight will reduce the percentage of free hydroxyl groups with respect to molecular weight. Alternatively, a reduction in the number of hydroxyl groups and a constant or increasing molecular weight will reduce the percentage of free hydroxyl groups with respect to molecular weight. The percentage of free hydroxyl groups with respect to molecular weight may be reduced by at least about one or more of: 1%, 2%, 3%, 4%. 5%. 6%, 7%, 8%, 9%, 10%, 15%, 20%, 25%, 30%, 35%, 40%, 45%, 50%, 55%, 60%, 65%, 70%, 75%, 80%, 85%, 90%, 95%, and 99%. The percentage of free hydroxyl groups with respect to molecular weight may be reduced between any of the preceding values, for example, between about 5% and about 10%, or between about 35% and about 50%.

The alkoxylated bio-oil composition may be characterized in comparison to a dewatered bio-oil by a reduced percentage of free carboxylic acids with respect to molecular weight, i.e., a reduced number of free carboxylic acids in a compound per the molecular weight of the compound. The alkoxylated bio-oil composition may be characterized in comparison to a dewatered bio-oil by a reduced acid value. In other words, a constant number of free carboxylic acids and an increasing molecular weight will reduce the percentage of free carboxylic acids with respect to molecular weight. The percentage of free carboxylic acids with respect to molecular weight may be reduced by at least about one or more of: 1%, 2%, 3%, 4%. 5%. 6%, 7%, 8%, 9%, 10%, 15%, 20%, 25%, 30%, 35%, 40%, 45%, 50%, 55%, 60%, 65%, 70%, 75%, 80%, 85%, 90%, 95%, and 99%. The percentage of free carboxylic acids with respect to molecular weight may be reduced between any of the preceding values, for example, between about 5% and about 10%, or between about 35% and about 50%.

Figure 2:
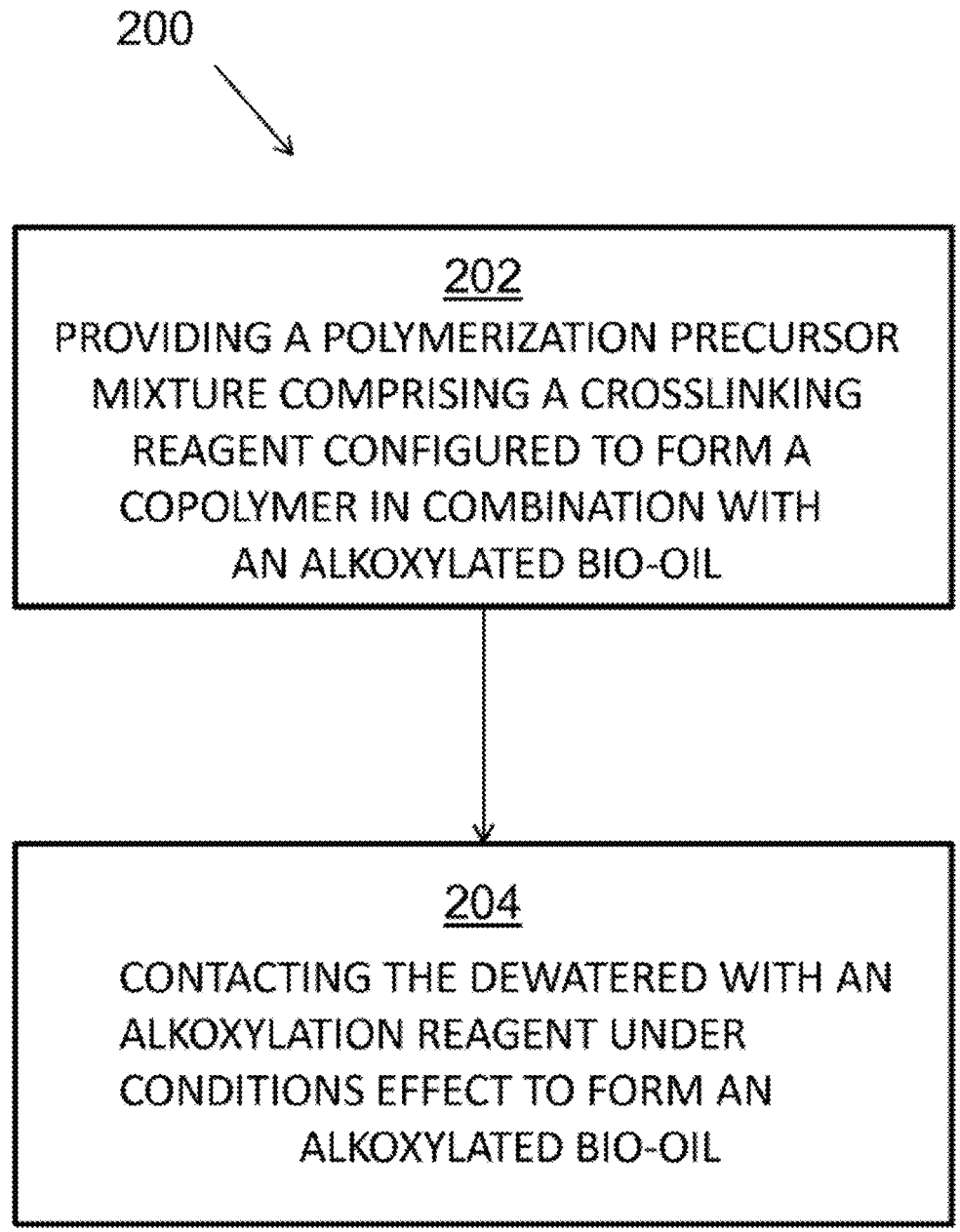
FIG. 2 is a flow diagram illustrating an example method for preparing a copolymer composition.

FIG. 2 is a flow diagram illustrating an example method 200 for preparing a copolymer composition. In various embodiments, method 200 may include providing a polymerization precursor mixture. The polymerization precursor mixture may include a crosslinking reagent. The crosslinking reagent may be configured to form a copolymer in combination with an alkoxylated bio-oil. The alkoxylated bio-oil composition may include an alkoxylated bio-oil. The method may include 204 reacting an alkoxylated bio-oil composition with the polymerization precursor mixture. The alkoxylated bio-oil composition may include the alkoxylated bio-oil. The method may include reaction conditions effective to form the copolymer composition.

Method 200 may include an alkoxylated bio-oil composition including an alkoxylated bio-oil derived from a dewatered bio-oil. The dewatered bio-oil may include water in less than about 3 wt % compared to an amount of dewatered bio-oil. The dewatered bio-oil may include water in wt % compared to an amount of dewatered bio-oil in less than about one or more of: 30, 25, 20, 15, 10, 5, 4, 3, 2, and 1. The dewatered bio-oil may include water in a wt % in comparison to an amount of dewatered bio-oil between any of the preceding values, for example, between about 2 and about 3, or between about 5 and about 10.

The alkoxylated bio-oil composition may include an alkoxylated bio-oil derived from a bio-oil. The bio-oil may be produced by pyrolysis of a biomass. The bio-oil may be produced by catalytic pyrolysis of a biomass. The biomass may originate from wood or other lignocellulosic-containing biomass. The alkoxylated bio-oil may result from a direct alkoxylation of a dewatered bio-oil with an alkoxylation reagent.

The alkoxylation reagent may include an epoxide, commonly known as an oxirane or an alkylene oxide. The alkoxylation reagent may include ethylene oxide. The alkoxylation reagent may include ethylene oxide substituted with a linear or branched $C_1$-$C_6$ alkyl, such as propylene oxide. The alkoxylation reagent may include ethylene oxide substituted with a $C_3$-$C_6$ cycloalkyl group, such as 2-cyclohexyloxirane or 7-oxabicyclo[4.1.0]heptane. The alkoxylation reagent may include ethylene oxide substituted with a $C_4$-$C_{10}$ aryl or heteroaryl group, such as 2-phenyloxirane. The alkoxylation reagent may include one or more of a linear or branched $C_1$-$C_6$ alkyl, a $C_3$-$C_6$ cycloalkyl group, and a $C_4$-$C_{10}$ aryl or heteroaryl group.

The alkoxylation reagent may include a cyclic carbonate. The cyclic carbonate may include ethylene carbonate. The cyclic carbonate may include trimethylene carbonate. The cyclic carbonate may be substituted with a linear or branched $C_1$-$C_6$ alkyl, such as propylene carbonate. The cyclic carbonate may be substituted with a $C_3$-$C_6$ cycloalkyl group. The cyclic carbonate may be substituted with a $C_4$-$C_{10}$ aryl or heteroaryl group. The cyclic carbonate may include one or more of a linear or branched $C_1$-$C_6$ alkyl, a $C_3$-$C_6$ cycloalkyl group, and a $C_4$-$C_{10}$ aryl or heteroaryl group.

The alkoxylation reagent may include one or more of an epoxide and a cyclic carbonate.

Method 200 may include a polymerization precursor mixture. The polymerization precursor mixture may include a crosslinking reagent. The crosslinking reagent may include at least two isocyanate groups, such as a polyisocyanate reagent. The reagent may be effective to form the copolymer composition upon reaction with the alkoxylated bio-oil composition. The polymerization precursor mixture may include one or more of: toluene diisocyanate, methylene diphenyl diisocyanate, 1,6 hexamethylene diisocyanate, 1-isocyanato-3-isocyanatomethyl-3,5,5-trimethylcyclohexane, and 4,'4-diisocyanato dicyclohexylmethane. The polymerization precursor mixture may include one or more of: ethylene diisocyanate, 1,4-tetramethylene diisocyanate, 1,12-dodecane diisocyanate, 1,3-cyclobutane diisocyanate, 1,3-cyclohexane diisocyanate, 1,4-cyclohexane diisocyanate, hexahydrotolylene-2,4-diisocyanate, hexahydrotolylene-2,6-diisocyanate, diphenylmethane 2,4'-diisocyanate, diphenylmethane 4-4'-diisocyanate, naphthylene-1,5-diisocyanate, triphenyl methane-4,4',4"-triisocyanate, polyphenyl-polymethylene polyisocyanate, m-isocyanatophenyl sulphonyl isocyanate, p-isocyanatophenyl sulphonyl isocyanate, perchlorinated aryl polyisocyanate, polyisocyanate containing carbodiimide groups, polyisocyanates containing allophanate groups, polyisocyanates containing isocyanurate groups, polyisocyanates containing urethane groups, polyisocyanate containing acrylated urea groups, polyisocyanates prepared by telmerization reactions, polyisocyanates containing ester groups, polyisocyanates containing polymer fatty acid groups, and the like.

Method 200 for producing the copolymer composition may include a copolymer including a polyurethane. The polyurethane may be produced by contacting a polymerization precursor mixture including a polyisocyanate reagent to the alkoxylated bio-oil composition.

The polymerization precursor mixture may include a blowing agent. The blowing agent may include water. The blowing agent may include a hydrocarbon. The blowing agent may include a halogenated hydrocarbon. The blowing agent may include a volatile organic compound.

The polymerization precursor mixture may include a surfactant. The surfactant may be a surfactant configured to support polyurethane foam formation. The surfactant may include, for example, a silicone surfactants. Suitable silicone surfactants are commercially available, for example, the DABCO® series of silicone surfactants (Air Products and Chemicals, Inc., Allentown, Pa.), including, for example, one or more of: SI3102, DC198, DC193, DC2525, DC2584, DC2585, DC3042, DC3043, DC5000, DC5043, and the like, e.g., DABCO® DC193.

Method 200 for producing the copolymer composition may include contacting a viscosity-reducing modifier to the alkoxylated bio-oil and/or the polymerization precursor mixture. The method may include contacting the viscosity-reducing modifier to the alkoxylated bio-oil polyol. The method may include contacting the viscosity-reducing modifier to the polymerization precursor mixture. The viscosity-reducing modifier may be a viscosity-reducing modifier polyol. The viscosity-reducing modifier polyol may include a petroleum-derived polyol, a polyester polyol, a bio-based polyester polyol, and the like. Suitable bio-based polyester polyols may include, but may be not limited to, bio-based polyester polyols, such as Priplast bio-based polyester polyols (Croda USA, New Castle, Del.). The viscosity-reducing modifier polyol may include a diol, a glycol, a triol, a tetraol, and the like. The viscosity-reducing modifier polyol may include one or more of: ethylene glycol, propylene glycol, neopentyl glycol, 2-methyl-1,3-propane diol, glycerol, trimethylolpropane, hexanetriol, butanetriol, trimethylolethane, pentaerythritol, mannitol, sorbitol, methylglucoside, diethylene glycol, polybutylene glycol, and the like.

The polymerization precursor mixture may include a polyol. The polyol may include a petroleum-derived polyol. The polyol may include a polyester polyol. The polyol may include a bio-based polyester polyol. Suitable bio-based polyester polyols may include, but may be not limited to, bio-based polyester polyols, such as Priplast bio-based polyester polyols (Croda USA, New Castle, Del.). The polyol may include a diol, a glycol, a triol, a tetraol, and the like. The polyol may include one or more of: ethylene glycol, propylene glycol, neopentyl glycol, 2-methyl-1,3-propane diol, glycerol, trimethylolpropane, hexanetriol, butanetriol, trimethylolethane, pentaerythritol, mannitol, sorbitol, methylglucoside, diethylene glycol, polybutylene glycol, and the like.

The polyol may be present in a weight % between about 5 and about 95 compared to an amount of the alkoxylated bio-oil. The polyol may be present in a weight % of at least about one or more of: 5, 10, 15, 20, 25, 30, 35, 40, 45, 50, 55, 60, 65, 70, 75, 80, 85, 90, 95, and 100. The polyol may be present in a weight % between any of the preceding values, for example, between about 20 and about 45, or between about 30 and about 35. One or more of the petroleum polyol and the bio-based polyester polyol may be incorporated into the copolymer as a polyol monomer unit. One or more of the petroleum polyol and the bio-based polyester polyol may serve as a viscosity-reducing agent. One or more of the petroleum polyol and the bio-based polyester polyol may form a copolymer with the crosslinking reagent.

The polymerization precursor mixture may include an alkanol amine. The alkanol amine may condense with unreacted carboxylic acids in the alkoxylated bio-oil composition. The reaction of alkanol amine and carboxylic acids may produce hydroxyamides. Hydroxyamides may facilitate polyurethane formation by increasing the reactivity of the hydroxyamide alcohols through inductive effects.

The polymerization precursor mixture may include a promoter. The promoter may include a polyurethane promoter. A polyurethane promoter may include a base. The base may include a non-nucleophilic base. The base may serve as a proton transfer agent. The base may include a trialkylamine. The base may include triethylene amine, pyridine, dimethylamino pyridine, and the like. The polyurethane promoter may include an acid. The acid may include a Brønsted acid or a Lewis acid. Suitable polyurethane promoters (catalysts) may include, but are not limited to, amine compounds, hypophosphite salts, zeolites, metal complexes such as stannous or stannic salts, and combinations thereof. Suitable amine catalysts may include, but are not limited to, tertiary amines such as triethylenediamine, dimethylcyclohexylamine, dimethylethanolamine, and the like. Hypophosphite salts include, for example, alkali metal salts such as sodium hypophosphite and alkali earth metal salts such as calcium hypophosphite, and the like. Catalysts for polyurethane polymerization may be based on metallic compounds of mercury, lead, tin, bismuth, zinc, and the like. Such metallic compounds may include one or more different oxidation states (I), (II), (III), or (IV), for example, tin(II) and tin(IV) compounds. Such metallic compounds of mercury, lead, tin, bismuth, zinc, and the like, may include metallic carboxylates, oxides, mercaptides, and the like. For example, mercury carboxylates, bismuth carboxylates, zinc carboxylates, tin carboxylates and the like may be suitable catalysts. For example, metal carboxylate compounds may include one or more carboxylates. Such one or more carboxylates may include monocarboxylates, or two or more carboxylates in the same organic carboxylate, such as the dicarboxylate oxalate in tin (II) oxalate. Metal carboxylate compounds may also include alkyl carboxylates with one or more pendant alkyl groups, e.g., dialkyl tin dicarboxylates such as dibutyltin dilaurate. For example, the method may include providing a tin (II) oxalate as a catalyst.

The polymerization precursor mixture may include an amine. The amine may include a tertiary amine. The amine may include a trialkylamine. For example, the amine may include one or more of: DABCO® BDMA, DABCO® MP601, DABCO® RP202, DABCO® 1027, DABCO® 1028, DABCO® 2033, DABCO® 2039, DABCO® 2040, DABCO® 33-LV, DABCO® 33-LX, DABCO® 8154, DABCO® B-16, and the like (Air Products and Chemicals, Inc., Allentown, Pa.). The amine may include a polylalkylamino alkyl ether, for example, DABCO® BL-19 (Air Products and Chemicals, Inc., Allentown, Pa.).

The polymerization precursor mixture may include one or more of: a petroleum polyol, a bio-based polyester polyol, water, a silicone foam forming surfactant, a trialkylamine, a polyalkylamino alkyl ether, an alkanol amine, a promoter, an antioxidant, a flame retardant, an ultraviolet light stabilizer, a pigment, a dye, a plasticizer, and the like.

Method 200 may include a polymerization precursor mixture. The polymerization precursor mixture may include a crosslinking reagent including at least two carboxylic acid derivative groups, such as a polycarboxylic acid derivative reagent. The carboxylic acid derivatives may include one or more of: a carboxylic acid, an acyl halide, an ester, and an anhydride. The polymerization precursor mixture may include a reagent including at least one cyclic anhydride. The reagent may be effective to form the copolymer composition upon reaction with the alkoxylated bio-oil composition. The polymerization precursor mixture may include a reagent including one or more of: oxalic acid, malonic acid, maleic acid, succinic acid, fumaric acid, glutaric acid, adipic acid, pimelic acid, suberic acid, azelaic acid, sebacic acid, brassilic acid, dodecanedioic acid, hexadecanedioic acid, 1,2-phthatlic acid, 1,3-phthatlic acid, 1,4-phthatlic acid, trimellitic acid; $C_1$-$C_6$ esters of any of the preceding; corresponding acyl chlorides of any of the preceding, such as oxalyl chloride; $C_1$-$C_7$ anhydrides of any of the preceding; succinic anhydride, maleic anhydride, phthalic anhydride, pyromellitic dianhydride, 1,2-cyclopentanedicarboxylic anhydride, glutaric anhydride, 2,7-oxepanedione, naphthalenetetracarboxylic dianhydride, tetrahydrophthalic acid anhydride, hexahydrophthalic acid anhydride, and the like.

Method 200 may include reaction conditions in the presence of a promoter. For example, the catalyst may be a polyester polymerization catalyst for reacting the alkoxylated bio-oil composition with a polymerization precursor mixture including a polycarboxylic acid derivative reagent, as described herein, to form the copolymer composition. Suitable polyester catalysts may include, but are not limited to, Brønsted acids, Brønsted bases, and Lewis acids. For example, suitable Brønsted acids may include inorganic acids, such as hydrochloric acid, hydroiodic acid, sulfuric acid, and the like. For example, suitable Brønsted acids may include organic acids, such as acetic acid, propionic acid, para-toluene sulfonic acid, triflic acid, protonated amines, and the like. For example, suitable Brønsted bases may include alkali metal hydroxides, such as sodium hydroxide or potassium hydroxide; alkali metal carbonates and bicarbonates, such as sodium carbonate, cesium carbonate, and sodium bicarbonate; amines, such as triethylamine, pyridine, dimethylamino pyridine, and the like. For example, suitable Lewis acids may include reagents based on transition metals, post-transition metals, metalloids, and lanthanides, for example, reagents including scandium, titanium, iron, tin, zinc, copper, gold, aluminum, tin, bismuth, boron, silicon, lanthanium, samarium, and europium. For example, Lewis acids may include scandium triflate, iron trichloride, zinc chloride, copper chloride, aluminum trichloride, aluminum oxide, boron trichloride, boron trifluoride, and the like.

Method 200 for preparing the copolymer composition may include a copolymer including a polyester. The polyester may be produced by a reaction between a polymerization precursor mixture including a crosslinking reagent including a polycarboxylic acid derivative reagent and the alkoxylated bio-oil composition.

Method 200 may include a polymerization precursor mixture. The polymerization precursor mixture may include a crosslinking reagent. The crosslinking reagent may include a phenol-containing compound. The phenol compound may be substituted at an aryl carbon with at least one 1-hydroxyalkyl group, e.g., hydroxymethyl group to form a benzylic alcohol. The 1-hydroxyalkyl group may be represented by —$CR^1R^2OH$, wherein $R^1$ and $R^2$ may be H, $CH_3$, $CH_2CH_3$, $CH_2CH_2CH_3$, $CH_2CH_2CH_2CH_3$, $C_6H_5$, CHO, CHO, $CH_2CHO$, $CH_2CH_2CHO$, $CH_2CH_2CH_2CHO$, $C(O)CH_3$, or $CH_2C(O)CH_3$.

The crosslinking reagent may be effective to form the copolymer composition upon reaction with the alkoxylated bio-oil composition. The crosslinking reagent may include, for example, one or more of: 2-hydroxybenzyl alcohol, 4-hydroxybenzyl alcohol, 4-(hydroxymethyl)-2-methylphenol, (2-hydroxy-1,3-phenylene)dimethanol, 2,6-bis(hydroxylmethyl)-p-cresol, 5-(t-butyl)-2-hydroxy-1,3-phenylene) dimethanol, 4-hydroxy-1,3-phenylene)dimethanol, and the like.

Alternatively, or in addition to, the polymerization precursor mixture may include a crosslinking reagent including a phenol compound and the 1-hydroxyalkyl moiety may be installed on the phenol compound in situ. The polymerization precursor mixture may further include an aldehyde. The polymerization precursor mixture may include, for example, formaldehyde. The polymerization precursor mixture may include one or more of: formaldehyde, acetaldehyde, proprionaldehyde, butryaldehyde, glyoxal, propane-1,3-dial, butane-1,4-dial, glutaraldehyde, and the like.

The polymerization precursor mixture may include a ketone. The polymerization precursor mixture may include one or more of: acetone, 2-butanone, 2-pentanone, 3-pentanone, butane-2,3-dione, pentane-2,4-dione, and the like. The polymerization precursor mixture may include an aldehyde and a ketone, such as formaldehyde and acetone. One or more of the aldehyde and ketone may be at least partly soluble in water.

The polymerization precursor mixture may include one or more of an aldehyde and a ketone.

The amount of aldehyde and/or ketone may be present in the polymerization precursor mixture in an amount less than an amount of the phenol compound present in the polymerization precursor mixture. The amount of aldehyde and/or ketone may be present in the polymerization precursor mixture in amount substantially equal to an amount of the phenol compound present in the polymerization precursor mixture. The amount of aldehyde and/or ketone may be present in the polymerization precursor mixture in amount greater than an amount of the phenolic compound present in the polymerization precursor mixture.

The polymerization precursor mixture may include a phenol-formaldehyde resin and one or more of an aldehyde and ketone. The polymerization precursor mixture may include a phenol-formaldehyde resin and no aldehyde or ketone in order to prepare a copolymer blend. The polymerization precursor mixture may include a bio-oil, the bio-oil including a phenol moiety. The polymerization precursor including the bio-oil including the phenol moiety may further include one or more of an aldehyde and ketone.

Method 200 for preparing the copolymer composition may include a copolymer including a phenol-formaldehyde resin. The phenol-formaldehyde resin may be produced by a reaction between a polymerization precursor mixture including a crosslinking reagent including a phenol compound substituted at an aryl carbon with a 1-hydroxyalkyl group and the alkoxylated bio-oil composition.

Method 200 may include a polymerization precursor mixture. The polymerization precursor mixture may include a phenol compound, a urea or a substituted urea, and one or more of: formaldehyde, acetaldehyde, propionaldehyde, butryaldehyde, valeraldehyde, glutaraldehyde glyoxal, benzaldehyde, propane-1,3-dial, butane-1,4-dial, acetone, 2-butanone, 2-pentanone, 3-pentanone, butane-2,3-dione, and pentane-2,4-dione. The substituted urea may include alkyl N—N'-substitution, for example, with methyl groups.

The polymerization precursor mixture may include a phenol-urea-formaldehyde resin, a urea or substituted urea, and one or more of an aldehyde and ketone. The polymerization precursor mixture may include a phenol-urea-formaldehyde resin and no urea or substituted urea and no aldehyde or ketone in order to prepare a copolymer blend. The polymerization precursor mixture may include a bio-oil, the bio-oil including a phenol moiety. The polymerization precursor including the bio-oil including the phenol moiety may further include a urea or substituted urea and one or more of an aldehyde and ketone.

Method 200 for preparing the copolymer composition may include a copolymer including a phenol-urea-formaldehyde resin. The phenol-urea-formaldehyde resin may be produced by a reaction between a polymerization precursor mixture including a crosslinking reagent including a phenol compound substituted at an aryl carbon with a benzylic urea group, wherein the benzylic urea group is N-substituted with a —$CR^1R^2OH$ group, e.g., —$CH_2OH$, and the alkoxylated bio-oil composition.

Method 200 may include a polymerization precursor mixture. The polymerization precursor mixture may a urea or a substituted urea, and one or more of: formaldehyde, acetaldehyde, propionaldehyde, butryaldehyde, valeraldehyde, glutaraldehyde glyoxal, benzaldehyde, propane-1,3-dial, butane-1,4-dial, acetone, 2-butanone, 2-pentanone, 3-pentanone, butane-2,3-dione, and pentane-2,4-dione. The substituted urea may include alkyl N—N'-substitution, for example, with methyl groups.

The polymerization precursor mixture may include a urea-formaldehyde resin, a urea or substituted urea, and one or more of an aldehyde and ketone. The polymerization precursor mixture may include a urea-formaldehyde resin and no urea or substituted urea and no aldehyde or ketone in order to prepare a copolymer blend.

Method 200 for preparing the copolymer composition may include a copolymer including a urea-formaldehyde resin. The urea-formaldehyde resin may be produced by a reaction between a polymerization precursor mixture including a crosslinking reagent including a urea group N—N'-substituted with a —$CR^1R^2OH$ group, e.g., $CH_2OH$, and the alkoxylated bio-oil composition.

It is not intended that the components of the polymerization precursor mixture be premixed or allowed to stand prior to the addition of the alkoxylated bio-oil composition. The components of the polymerization precursor mixture may be added in a step-wise fashion in order to prevent premature reaction and production of unwanted side products. For example, a promoter may be added to the alkoxylated bio-oil prior to the addition of the crosslinking reagent. For example, a petroleum polyol may be added to the alkoxylated bio-oil prior to the addition of the crosslinking reagent.

Method 200 may include a reaction conditions effective to form the copolymer composition. The reaction conditions may include a reaction temperature in ° C. of at least about one or more of: 0, 10, 20, 25, 30, 35, 40, 50, 55, 60, 65, 70, 75, 80, 85, 90, 95, 100, 105, 110, 115, 120, 125, 130, 135, 140, 145, 150, 155, 160, 165, 170, 175, and 180. The reaction conditions may include a reaction temperature in ° C. between any of the preceding values, for example, between about 60 and about 100, or between bout 30 and about 180.

The reaction conditions may include a reaction pressure in pounds per square inch of at least about one or more of: 0, 15, 25, 50, 75, 100, 125, 150, 175, 200, 225, 250, 275, 300, 325, 350, 375, 400, 425, 450, 475, 500, 525, 550, 575, and 600. The reaction conditions may include a reaction pressure in pounds per square inch between any of the preceding values, for example, between about 15 and about 200, or between about 100 and about 500.

Method 200 may further include configuring the copolymer composition as one or more of: a foam, a spray foam, an extrusion, an injection molding, a coating, an adhesive, an elastomer, a foundry resin, a sealant, a casting, a fiber, a potting compound, a reaction injection molded (RIM) plastic, a microcellular elastomer or foam, and an integral skin foam.

In various embodiments, a copolymer composition is provided. The copolymer composition may include a copolymer. The copolymer may include an alkoxylated bio-oil unit. The alkoxylated bio-oil unit may be derived from an alkoxylated bio-oil composition including an alkoxylated bio-oil. The copolymer may include a cross-linking unit. The crosslinking unit may be derived from a crosslinking reagent. The crosslinking unit may be effective to crosslink more than one alkoxylated bio-oil unit to form the copolymer.

The copolymer composition may include an amount of one or more of: a free alkylene glycol and a cross-linked polyalkylene glycol in less than about 10 wt % compared to an amount of the copolymer. The copolymer composition may include an amount in wt % of one or more of the free alkylene glycol and the cross-linked polyalkylene glycol of less than about one or more of: 40, 35, 30, 25, 20, 15, 10 and 5. The copolymer composition may include an amount in wt % of one or more of the free alkylene glycol and the cross-linked polyalkylene glycol between any of the preceding values, for example, between about 5 and about 10, or between about 10 and about 15.

The copolymer may include an alkoxylated bio-oil unit derived from an alkoxylated bio-oil derived from a dewatered bio-oil. The dewatered bio-oil may include water in less than about 3 wt % compared to the amount of the dewatered bio-oil. The dewatered bio-oil may include water in a wt % of less than about one or more of: 30, 25, 20, 15, 10, 5, 4, 3, 2, and 1. The dewatered bio-oil may include water in a wt % between any of the preceding values, for example, between about 4 and about 10, or between about 3 and about 5.

The dewatered bio-oil used to produce the alkoxylated bio-oil may include water in less than about 3 wt % compared to an amount of dewatered bio-oil. The presence of water in an alkoxylation reaction with bio-oil and an alkoxylating reagent may produce a free alkylene glycol, such as propylene glycol, upon reaction of the water with the alkoxylating reagent, such as propylene oxide. Increasing amounts of the free alkylene glycol may result in an alkoxylated bio-oil composition that is unsuitable for preparing materials, such as polyurethane foams. The alkoxylation of a dewatered bio-oil including water in about 1 wt % may produce a free alkylene glycol in about 3.2 wt %. The alkoxylation of the dewatered bio-oil may produce an alkoxylated bio-oil. The alkoxylated bio-oil may provide the alkoxylated bio-oil units in the copolymer.

The alkoxylated bio-oil may be derived from a dewatered bio-oil derived from a bio-oil. The bio-oil may be produced from pyrolysis of a biomass. The bio-oil may be produced from catalytic pyrolysis of a biomass. The biomass may originate from wood or other lignocellulosic-containing biomass. The alkoxylated bio-oil may result from a direct alkoxylation of a dewatered bio-oil with an alkoxylation reagent.

The alkoxylation reagent may include an epoxide, commonly known as an oxirane or an alkylene oxide. The alkoxylation reagent may include ethylene oxide. The alkoxylation reagent may include ethylene oxide substituted with a linear or branched $C_1$-$C_6$ alkyl, such as propylene oxide. The alkoxylation reagent may include ethylene oxide substituted with a $C_3$-$C_6$ cycloalkyl group, such as 2-cyclohexyloxirane or 7-oxabicyclo[4.1.0]heptane. The alkoxylation reagent may include ethylene oxide substituted with a $C_4$-$C_{10}$ aryl or heteroaryl group, such as 2-phenyloxirane. The alkoxylation reagent may include one or more of a linear or branched $C_1$-$C_6$ alkyl, a $C_3$-$C_6$ cycloalkyl group, and a $C_4$-$C_{10}$ aryl or heteroaryl group.

The alkoxylation reagent may include a cyclic carbonate. The cyclic carbonate may include ethylene carbonate. The cyclic carbonate may include trimethylene carbonate. The cyclic carbonate may be substituted with a linear or branched $C_1$-$C_6$ alkyl, such as propylene carbonate. The cyclic carbonate may be substituted with a $C_3$-$C_6$ cycloalkyl group. The cyclic carbonate may be substituted with a $C_4$-$C_{10}$ aryl or heteroaryl group. The cyclic carbonate may include one or more of a linear or branched $C_1$-$C_6$ alkyl, a $C_3$-$C_6$ cycloalkyl group, and a $C_4$-$C_{10}$ aryl or heteroaryl group.

The alkoxylation reagent may include one or more of an epoxide and a cyclic carbonate. The nature of the alkoxylation reagent with determine the nature of the alkoxylated bio-oil used to prepare the copolymer composition. The nature of the alkoxylated bio-oil may influence the properties of the copolymer composition.

The alkoxylated bio-oil composition may be prepared by providing a dewatered bio-oil. The alkoxylated bio-oil composition may be prepared by contacting the dewatered bio-oil with an alkoxylation reagent. The alkoxylated bio-oil composition may be prepared by contacting the dewatered bio-oil with an alkoxylation reagent in the present of a promoter, such as an alkali metal hydroxide, and the like. The alkoxylated bio-oil composition may be prepared under reaction conditions effective to form the alkoxylated bio-oil composition.

The copolymer composition may include a crosslinking unit. The crosslinking unit may be derived from a crosslinking reagent. The crosslinking reagent may include at least two isocyanate groups. The crosslinking reagent may be effective to form the copolymer composition upon reaction with the alkoxylated bio-oil composition. The crosslinking reagent may include one or more of: toluene diisocyanate, methylene diphenyl diisocyanate, 1,6 hexamethylene diisocyanate, 1-isocyanato-3-isocyanatomethyl-3,5,5-trimethylcyclohexane, and 4,'4-diisocyanato dicyclohexylmethane. The polymerization precursor mixture may include one or more of: ethylene diisocyanate, 1,4-tetramethylene diisocyanate, 1,12-dodecane diisocyanate, 1,3-cyclobutane diisocyanate, 1,3-cyclohexane diisocyanate, 1,4-cyclohexane diisocyanate, hexahydrotolylene-2,4-diisocyanate, hexahydrotolylene-2,6-diisocyanate, diphenylmethane 2,4'-diisocyanate, diphenylmethane 4-4'-diisocyanate, naphthylene-1,5-diisocyanate, triphenyl methane-4,4',4''-triisocyanate, polyphenyl-polymethylene polyisocyanate, m-isocyanatophenyl sulphonyl isocyanate, p-isocyanatophenyl sulphonyl isocyanate, perchlorinated aryl polyisocyanate, polyisocyanate containing carbodiimide groups, polyisocyanates containing allophanate groups, polyisocyanates containing isocyanurate groups, polyisocyanates containing urethane groups, polyisocyanate containing acrylated urea groups, polyisocyanates prepared by telmerization reactions, polyisocyanates containing ester groups, polyisocyanates containing polymer fatty acid groups, and the like.

The copolymer composition may include a copolymer. The copolymer may include a polyurethane. The polyurethane may include alkoxylated bio-oil units and urethane (carbamate) crosslinking units. The polyurethane may result from contacting an alkoxylated bio-oil composition with a polyisocyanate crosslinking reagent. The polyurethane may be referred to as a polyether polyurethane, a polyurethane polyether, and the like.

The copolymer composition may include a crosslinking unit. The crosslinking unit may be derived from a crosslinking reagent. The crosslinking reagent may include at least two carboxylic acid derivative groups. The carboxylic acid derivatives may include one or more of: a carboxylic acid, an acyl halide, an ester, and an anhydride. The polymerization precursor mixture may include a reagent including at least one cyclic anhydride. The reagent may be effective to form the copolymer composition upon reaction with the alkoxylated bio-oil composition. The crosslinking reagent may include a reagent including one or more of: oxalic acid, malonic acid, maleic acid, succinic acid, fumaric acid, glutaric acid, adipic acid, pimelic acid, suberic acid, azelaic acid, sebacic acid brassilic acid, dodecanedioic acid, hexadecanedioic acid, 1,2-phthatlic acid, 1,3-phthatlic acid, 1,4-phthatlic acid, trimellitic acid; $C_1$-$C_6$ esters of any of the preceding; corresponding acyl chlorides of any of the preceding, such as oxalyl chloride; $C_1$-$C_7$ anhydrides of any of the preceding; succinic anhydride, maleic anhydride, phthalic anhydride, pyromellitic dianhydride, 1,2-cyclopentanedicarboxylic anhydride, glutaric anhydride, 2,7-oxepanedione, naphthalenetetracarboxylic dianhydride, tetrahydrophthalic acid anhydride, hexahydrophthalic acid anhydride, and the like.

The copolymer composition may include a copolymer. The copolymer may include a polyester. The polyester may include alkoxylated bio-oil units and ester crosslinking units. The polyester may result from contacting an alkoxylated bio-oil composition with a polycarboxylic acid derivate crosslinking reagent. The polyester may be referred to as a polyester ether, a polyester polyether, a polyether ester, and the like.

The copolymer composition may include a crosslinking unit. The crosslinking unit may be derived from a crosslinking reagent. The crosslinking reagent may include a phenol compound substituted at an aryl carbon with a 1-hydroxyalkyl group. The crosslinking reagent may result from an in situ reaction of a phenol compound and one or more of: formaldehyde, acetaldehyde, propionaldehyde, butryaldehyde, valeraldehyde, benzaldehyde, glyoxal, propane-1,3-dial, butane-1,4-dial, and glutaraldehyde, acetone, 2-butanone, 2-pentanone, 3-pentanone, butane-2,3-dione, and pentane-2,4-dione. The phenol compound may include, for example, phenol or a substituted phenol. The phenol compound may include bio-oil including a phenol moiety.

The copolymer composition may be blended with other polymers and copolymers, for example, the copolymer composition may be blended with a novolac-type or resol-type resin.

The copolymer composition may include a copolymer. The copolymer may include a phenol-formaldehyde resin. The phenol-formaldehyde resin may include alkoxylated bio-oil units and phenol-methylene crosslinking units. The phenol-formaldehyde may result from contacting an alkoxylated bio-oil composition with a phenol compound substituted with a benzylic alcohol crosslinking reagent. The phenol-formaldehyde resin may be referred to as a phenol-aldehyde resin, a phenol-ketone resin, and the like.

The copolymer composition may include a crosslinking unit. The crosslinking unit may be derived from a crosslinking reagent. The crosslinking reagent may result from an in situ reaction of a phenol compound, a urea or substituted urea, and one or more of: formaldehyde, acetaldehyde, propionaldehyde, butryaldehyde, valeraldehyde, benzaldehyde, glyoxal, propane-1,3-dial, butane-1,4-dial, and glutaraldehyde, acetone, 2-butanone, 2-pentanone, 3-pentanone, butane-2,3-dione, and pentane-2,4-dione. The phenol compound may include, for example, phenol or a substituted phenol. The phenol compound may include bio-oil including a phenol moiety.

The copolymer composition may be blended with other polymers and copolymers, for example, the copolymer composition may be blended with a novolac-type or resol-type resin.

The copolymer composition may include a copolymer. The copolymer may include a phenol-urea-formaldehyde resin. The phenol-urea-formaldehyde resin may include alkoxylated bio-oil units and phenol-methylene-urea crosslinking units. The phenol-urea-formaldehyde may result from contacting an alkoxylated bio-oil composition with a phenol compound in the presence of a urea or a substituted urea and one or more of an aldehyde and a ketone. The phenol-urea-formaldehyde resin may be referred to as a phenol-urea-aldehyde resin, a phenol-urea-ketone resin, and the like.

The copolymer composition may include a crosslinking unit. The crosslinking unit may be derived from a crosslinking reagent. The crosslinking reagent may result from an in situ reaction of a urea or substituted urea, and one or more of: formaldehyde, acetaldehyde, propionaldehyde, butryaldehyde, valeraldehyde, benzaldehyde, glyoxal, propane-1,3-dial, butane-1,4-dial, and glutaraldehyde, acetone, 2-butanone, 2-pentanone, 3-pentanone, butane-2,3-dione, and pentane-2,4-dione.

The copolymer composition may be blended with other polymers and copolymers, for example, the copolymer composition may be blended with a novolac-type or resol-type resin.

The copolymer composition may include a copolymer. The copolymer may include a urea-formaldehyde resin. The urea-formaldehyde resin may include alkoxylated bio-oil units and methylene-urea crosslinking units. The urea-formaldehyde may result from contacting an alkoxylated bio-oil composition in the presence of a urea or a substituted urea and one or more of an aldehyde and a ketone. The urea-formaldehyde resin may be referred to as a urea-aldehyde resin, a urea-ketone resin, and the like.

The copolymer composition may be configured as one or more of: a foam, a spray foam, an extrusion, an injection molding, a coating, an adhesive, an elastomer, a foundry resin, a sealant, a casting, a fiber, a potting compound, a reaction injection molded (RIM) plastic, a microcellular elastomer or foam, and an integral skin foam.

In various embodiments, a method for preparing an alkoxylated bio-oil composition is provided. The method may include providing a dewatered bio-oil. The method may include contacting the dewatered bio-oil with an alkoxylation reagent under reaction conditions effective to form an alkoxylated bio-oil.

The method may include any aspect of the method described herein. For example, in some embodiments, the method may include dewatering a bio-oil to produce the dewatered by one or more of: distillation, vacuum distillation, azeotropic distillation, evaporation, salting out, freeze drying, adsorption, desiccation, and centrifugation.

In several embodiments, the alkoxylation reagent may include one or more of: an epoxide and a cyclic carbonate. The alkoxylation reagent may include one or more of: ethylene oxide optionally substituted with one or more of a linear or branched $C_1$-$C_6$ alkyl, a $C_3$-$C_6$ cycloalkyl group, and a $C_4$-$C_{10}$ aryl or heteroaryl group; ethylene carbonate optionally substituted with one or more of a linear or branched $C_1$-$C_6$ alkyl, a $C_3$-$C_6$ cycloalkyl group, and a $C_4$-$C_{10}$ aryl or heteroaryl group; and trimethylene carbonate optionally substituted with one or more of a linear or branched $C_1$-$C_6$ alkyl, a $C_3$-$C_6$ cycloalkyl group, and a $C_4$-$C_{10}$ aryl or heteroaryl group.

In several embodiments, the reaction conditions may include one or more of: the alkoxylation reagent being present in an amount greater than 5 wt % compared to an amount of the dewatered bio-oil; the presence of a promoter, the promoter including one of an acid and a base; the promoter being present in an amount between about 0.005 wt % and 5 wt % compared to an amount of the dewatered bio-oil; a reaction temperature of between about 80° C. and about 180° C.; a reaction pressure in pounds per square inch of between about 0 and about 600; the dewatered bio-oil including a pyrolytic bio-oil or a catalytic pyrolytic bio-oil; less than about 30 wt % water compared to the dewatered bio-oil; and production of a free alkylene glycol byproduct at less than about 40 wt % compared to the dewatered bio-oil.

In various embodiments, the method may include contacting the dewatered bio-oil with a promoter; allowing the dewatered bio-oil and the promotor to react for a period of time prior to contacting the dewatered bio-oil with the alkoxylation reagent; optionally heating the dewatered bio-oil and the promoter, optionally under reduced pressure, for a period of time prior to contacting the dewatered bio-oil with the alkoxylation reagent, the promoter may include an alkali metal hydroxide; and optionally condensing a water vapor into a container separate from the dewatered bio-oil and the promoter prior to contacting the dewatered bio-oil with the alkoxylation reagent.

In various embodiments, an alkoxylated bio-oil composition is provided. The alkoxylated bio-oil composition may include an alkoxylated bio-oil, the alkoxylated bio-oil derived from a dewatered bio-oil; and an amount of a free alkylene glycol of less than about 40 wt % compared to an amount of the alkoxylated bio-oil.

The alkoxylated bio-oil composition may include any aspect of the alkoxylated bio-oil composition described herein. For example, The alkoxylated bio-oil composition may be characterized by one or more of: including at least one polyalkylene glycol unit covalently bound to one or more of an acid, an alcohol, and a phenol functionality originated in the dewatered bio-oil; being produced from a direct alkoxylation of the dewatered bio-oil; the dewatered bio-oil including a pyrolytic bio-oil or a catalytic pyrolytic bio-oil; and in comparison to the dewatered bio-oil, by one or more of: a reduced viscosity, an increased molecular weight, a lower gel permeation chromatography retention time, and a reduced hydroxyl value.

In various embodiments, a method for preparing a copolymer composition is provided. The method may include providing a polymerization precursor mixture. The polymerization precursor mixture may include a crosslinking reagent configured to form a copolymer in combination with an alkoxylated bio-oil. The method may include reacting an alkoxylated bio-oil composition including the alkoxylated bio-oil with the polymerization precursor mixture under reaction conditions effective to form the copolymer composition.

The method may include any aspect of the method for preparing a copolymer composition described herein. For example, in some embodiments, the alkoxylated bio-oil characterized by one or more of: being produced from a direct alkoxylation of a dewatered bio-oil; the dewatered bio-oil including a pyrolytic bio-oil or a catalytic pyrolytic bio-oil; including at least one polyalkylene glycol unit covalently bound to one or more of an acid, an alcohol, and a phenol functionality originated in the dewatered bio-oil; and in comparison to the dewatered bio-oil, by one or more of: a reduced viscosity, an increased molecular weight, a lower gel permeation chromatography retention time, and a reduced hydroxyl value.

In some embodiments, the crosslinking reagent may include one of: at least two isocyanate groups; at least two carboxylic acid derivative groups; one or more of: a carboxylic acid, an ester, a acyl halide, a cyclic anhydride, and an anhydride; and a phenol compound substituted at an aryl carbon with at least one —$CR^1R^2OH$, wherein: $R^1$ is H, $CH_3$, $CH_2CH_3$, $CH_2CH_2CH_3$, $CH_2CH_2CH_2CH_3$, $C_6H_5$, CHO, CHO, $CH_2CHO$, $CH_2CH_2CHO$, $CH_2CH_2CH_2CHO$, $C(O)CH_3$, or $CH_2C(O)CH_3$; and $R^2$ is H, $CH_3$, $CH_2CH_3$, $CH_2CH_2CH_3$, $CH_2CH_2CH_2CH_3$, $C_6H_5$, CHO, CHO, $CH_2CHO$, $CH_2CH_2CHO$, $CH_2CH_2CH_2CHO$, $C(O)CH_3$, or $CH_2C(O)CH_3$.

In several embodiments, the polymerization precursor may include one of: (i) one or more of: toluene diisocyanate, methylene diphenyl diisocyanate, 1,6-hexamethylene diisocyanate, 1-isocyanato-3-isocyanatomethyl-3,5,5-trimethyl-cyclohexane, and 4,4'-diisocyanato dicyclohexylmethane; (ii) one or more of: a petroleum polyol, a bio-based polyester polyol, a foam forming surfactant, a trialkylamine, a polyalkylamino alkyl ether, an alkanol amine, a promoter, an antioxidant, a flame-retardant, an ultraviolet light stabilizer, a pigment, a dye, and a plasticizer; (iii) one or more of: formaldehyde, acetaldehyde, propionaldehyde, butryaldehyde, valeraldehyde, glutaraldehyde glyoxal, benzaldehyde, propane-1,3-dial, butane-1,4-dial, acetone, 2-butanone, 2-pentanone, 3-pentanone, butane-2,3-dione, and pentane-2,4-dione; (iv) a phenol compound, a urea or a substituted urea, and one or more of: formaldehyde, acetaldehyde, propionaldehyde, butryaldehyde, valeraldehyde, glutaraldehyde glyoxal, benzaldehyde, propane-1,3-dial, butane-1,4-dial, acetone, 2-butanone, 2-pentanone, 3-pentanone, butane-2,3-dione, and pentane-2,4-dione; (v) a urea or substituted urea and one or more of: formaldehyde, acetaldehyde, propionaldehyde, butryaldehyde, valeraldehyde, glutaraldehyde glyoxal, benzaldehyde, propane-1,3-dial, butane-1,4-dial, acetone, 2-butanone, 2-pentanone, 3-pentanone, butane-2,3-dione, and pentane-2,4-dione; and (vi) a phenol-formaldehyde resin.

In various embodiments, the method may include contacting a viscosity-reducing modifier to one or more of the alkoxylated bio-oil and the polymerization precursor mixture. The polymerization precursor mixture may include a phenol compound and one or more of an aldehyde and a ketone. The aldehyde may include one or more of: formaldehyde, acetaldehyde, propionaldehyde, butryaldehyde, valeraldehyde, benzaldehyde, glyoxal, propane-1,3-dial, butane-1,4-dial, and glutaraldehyde. The ketone may include one or more of: acetone, 2-butanone, 2-pentanone, 3-pentanone, butane-2,3-dione, and pentane-2,4-dione. The phenol compound and one or more of the aldehyde and the ketone may react to form a crosslinking agent including a phenol substituted at an aryl carbon with one or more of: —RCHOH and —$CR^1R^2OH$. R may be H, $CH_3$, $CH_2CH_3$, $CH_2CH_2CH_3$, $CH_2CH_2CH_2CH_3$, $C_6H_5$, CHO, $CH_2CHO$, $CH_2CH_2CHO$, or $CH_2CH_2CH_2CHO$. $R^1$ may be $CH_3$, $CH_2CH_3$, $CH_2CH_2CH_3$, $CH_2CH_2CH_2CH_3$, $C_6H_5$, $C(O)CH_3$, or $CH_2C(O)CH_3$; and $R^2$ is $CH_3$, $CH_2CH_3$, $CH_2CH_2CH_3$, $CH_2CH_2CH_2CH_3$, $C_6H_5$, $C(O)CH_3$, or $CH_2C(O)CH_3$.

In some embodiments, the copolymer may include one or more of: a phenol-formaldehyde resin; a phenol-urea-formaldehyde resin, a urea-formaldehyde resin, a polyester, and a polyurethane.

In various embodiments, a copolymer composition is provided. The copolymer composition may include a copolymer including: an alkoxylated bio-oil unit, the alkoxylated bio-oil unit derived from an alkoxylated bio-oil composition including an alkoxylated bio-oil; and a cross-linking unit, the cross-linking unit derived from a crosslinking reagent and effective to crosslink more than one alkoxylated bio-oil unit to form the copolymer.

The copolymer composition may include any aspect of the copolymer composition described herein. For example, in some embodiments, the alkoxylated bio-oil unit may be characterized by one or more of: derived from a dewatered bio-oil; derived from a direct alkoxylation of a dewatered bio-oil; derived from alkoxylation with one or more of an epoxide reagent and a cyclic carbonate; and derived from bio-oil being produced by pyrolysis or catalytic pyrolysis of a biomass. The copolymer may include one or more of: a polyurethane, a polyester, a phenol-formaldehyde resin, a phenol-urea-formaldehyde resin, a phenol-formaldehyde resin, a phenol-formaldehyde-urea resin, and a urea-formaldehyde resin. The cross-linking unit derived from a crosslinking reagent may be characterized by one of: (i) derived from a crosslinking reagent including at least two isocyanate groups; (ii) including at least two carboxylic acid derivative groups, the at least two carboxylic acid derivative groups including one or more of: a carboxylic acid, an ester, an acyl halide, an anhydride, and a cyclic anhydride; (iii) including a phenol compound substituted at an aryl carbon with a 1-hydroxyalkyl group; (iv) derived from a product of an in situ reaction of a phenol compound and one or more of: formaldehyde, acetaldehyde, propionaldehyde, butryaldehyde, valeraldehyde, benzaldehyde, glyoxal, propane-1,3-dial, butane-1,4-dial, and glutaraldehyde, acetone, 2-butanone, 2-pentanone, 3-pentanone, butane-2,3-dione, and pentane-2,4-dione; (v) derived from a product of an in situ reaction of a phenol compound, urea or a substituted urea, and one or more of: formaldehyde, acetaldehyde, propionaldehyde, butryaldehyde, valeraldehyde, benzaldehyde, glyoxal, propane-1,3-dial, butane-1,4-dial, and glutaraldehyde, acetone, 2-butanone, 2-pentanone, 3-pentanone, butane-2,3-dione, and pentane-2,4-dione; and (vi) derived from a product of an in situ reaction of urea or a substituted urea, and one or more of: formaldehyde, acetaldehyde, propionaldehyde, butryaldehyde, valeraldehyde, benzaldehyde, glyoxal, propane-1,3-dial, butane-1,4-dial, and glutaraldehyde, acetone, 2-butanone, 2-pentanone, 3-pentanone, butane-2,3-dione, and pentane-2,4-dione. The copolymer composition of claim may be configured as one or more of: a foam, a spray foam, an extrusion, an injection molding, a coating, an adhesive, an elastomer, a foundry resin, a sealant, a casting, a fiber, a potting compound, a reaction injection molded (RIM) plastic, a microcellular elastomer or foam, and an integral skin foam.

EXAMPLES

The following examples and results are tabulated in FIGS. 2-5.

Example 1: Alkoxylation of Dewatered Lite Bio-Oil and Copolymerization with Lupranate A sample of lite bio-oil (KF=35.3%) was placed onto a rotary evaporator at 70° C. under 25 mmHg reduced pressure for 2 h. The resulting dewatered lite bio-oil had a KF value (Karl Fischer) of 3.02%. A 300 mL autoclave was charged with the dewatered lite bio-oil (110.56 g), propylene oxide (47.58 g, 30 wt %), and potassium hydroxide (0.49 g, 0.44 wt %). The mixture was stirred and heated at 130° C. for 4 h, and the resulting alkoxylated lite bio-oil was transferred to a jar. The alkoxylated lite bio-oil exhibited a viscosity of 3.2 P. The alkoxylated lite bio-oil exhibited an acid value (AV) of 3.1 and a hydroxyl value (HV) of 584, as determined by a standard phosphorus ($^{31}$P) nuclear magnetic resonance (NMR) technique.

The alkoxylated lite bio-oil was mixed with a petroleum polyol (JEFFOL® SG-360, Huntsman), water, surfactant (DABCO® DC193, Air Products and Chemicals, Inc., Allentown Pa.) and amine (DABCO® 33LV), and promoter (NIAX*™ A1, Momentive Performance Materials Inc., Columbus, Ohio) and stirred at 3100 rpm for 1 min. LUPRANATE® M20S (BASF, Florham Park, N.J.) was added and the mixture was stirred at 3100 rpm for 6 sec. The mixture was poured into an open cake box (6"×6"×3"). The resulting alkoxylated lite bio-oil polyurethane foam did not rise over 1 in. This observation was likely due to the larger amounts of water present in the feed causing the production of polypropylene glycol.

Example 2: Alkoxylation of Dewatered Heavy+Lite Bio-Oil and Copolymerization with Lupranate A sample of pyrolytic bio-oil including lite and heavy bio-oil fractions representing a full composition bio-oil (KF=29.3%) was placed onto a rotary evaporator at 70° C. under 25 mmHg reduced pressure for 2 h. The resulting dewatered lite bio-oil had a KF value (Karl Fischer) of 1.86%. A 300 mL autoclave was charged with the dewatered full composition bio-oil (126.23 g), propylene oxide (54.35, 30 wt %), and potassium hydroxide (0.54 g, 0.43 wt %). The mixture was stirred and heated at 130° C. for 4 h, and the resulting alkoxylated full composition bio-oil was transferred to a jar. The alkoxylated full composition bio-oil had a viscosity of 12 P. The alkoxylated full composition bio-oil exhibited an acid value (AV) of 0 and a hydroxyl value (HV) of 507, as determined by a standard phosphorus ($^{31}$P) nuclear magnetic resonance (NMR) technique.

The alkoxylated full composition bio-oil was mixed with a petroleum polyol (JEFFOL® SG-360, Huntsman, The Woodlands, Tex.), water, surfactant (DABCO® DC193, Air Products and Chemicals, Inc., Allentown Pa.) and amine (DABCO® 33LV), and promoter (NIAX*™ A1, Momentive Performance Materials Inc., Columbus, Ohio) and stirred at 3100 rpm for 1 min. LUPRANATE® M20S (BASF, Florham Park, N.J.) was added and the mixture was stirred at 3100 rpm for 6 sec. The mixture was poured into an open cake box (6"×6"×3"). The resulting alkoxylated full composition bio-oil polyurethane provided a rigid foam and exhibited a compression strength of 100 psi and a density of 1.63.

Example 3: Alkoxylation of Dewatered Heavy Bio-Oil and Copolymerization with Lupranate A sample of heavy bio-oil (KF=11.3%) was placed onto a rotary evaporator at 70° C. under 25 mmHg reduced pressure for 2 h. The resulting dewatered lite bio-oil had a KF value (Karl Fischer) of 1.55%. A 300 mL autoclave was charged with the dewatered heavy bio-oil (103.30 g), propylene oxide (45.35, 30 wt %), and potassium hydroxide (0.48 g, 0.46 wt %). The mixture was stirred and heated at 130° C. for 4 h, and the resulting alkoxylated full composition bio-oil was transferred to a jar. The alkoxylated heavy bio-oil exhibited a viscosity of 49 P. The alkoxylated heavy bio-oil exhibited an acid value (AV) of 0 and a hydroxyl value (HV) of 415, as determined by a standard phosphorus ($^{31}$P) nuclear magnetic resonance (NMR) technique.

Figure 6:
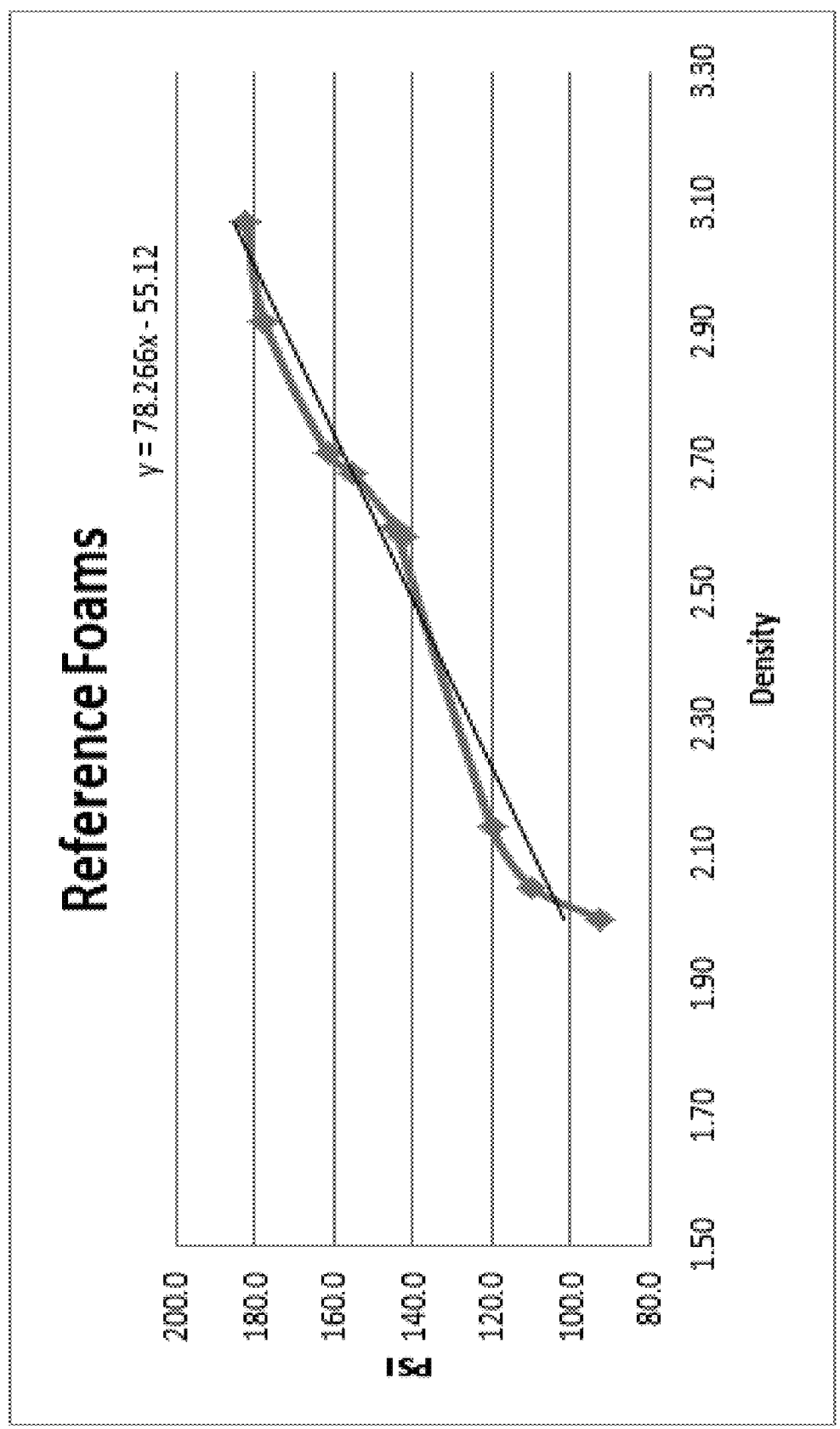
FIG. 6 is a graph illustrating a correlation between compressive strength and density of reference polyurethane foams.

The alkoxylated heavy bio-oil was mixed with a petroleum polyol (JEFFOL® SG-360, Huntsman, The Woodlands, Tex.), water, surfactant (DABCO® DC193, Air Products and Chemicals, Inc., Allentown Pa.) and amine (DABCO® 33LV), and promoter (NIAX*™ A1, Momentive Performance Materials Inc., Columbus, Ohio) and stirred at 3100 rpm for 1 min. LUPRANATE® M20S (BASF, Florham Park, N.J.) was added and the mixture was stirred at 3100 rpm for 6 sec. The mixture was poured into an open cake box (6"×6"×3"). The resulting alkoxylated heavy bio-oil polyurethane foam with a compression strength of 175 psi and a density of 1.85. A corrected deviation from a standard was determined to be 66 psi. The corrected deviation from a standard is the compressive strength difference from density corrected reference foam. The correction deviation from a standard may be calculated by taking the sample foam compressive strength and subtracting the reference foam compressive strength at the sample foam density as determined by linear extrapolation (see FIG. 6 for reference foam densities vs compressive strength correlations).

Example 4: Alkoxylation of Dewatered Bio-Oil Derived from Pyrolized Biomass and Copolymerizaton with Luprinate A sample of bio-oil (KF=10.5%) was placed onto a rotary evaporator at 90° C. under 25 mmHg reduced pressure for 4 h. A 300 mL autoclave was charged with the dewatered bio-oil (130.01 g), propylene oxide (55.97, 30 wt %), and potassium hydroxide (0.60 g, 0.46 wt %). The mixture was stirred and heated at 130° C. for 4 h, and the resulting alkoxylated full composition bio-oil was transferred to a jar. The alkoxylated bio-oil exhibited a viscosity of 342 P. The alkoxylated bio-oil exhibited an acid value (AV) of 0 and a hydroxyl value (HV) of 242, as determined by a standard phosphorus ($^{31}$P) nuclear magnetic resonance (NMR) technique.

The alkoxylated bio-oil was mixed with a petroleum polyol (JEFFOL® SG-360, Huntsman, The Woodlands, Tex.), water, surfactant (DABCO® DC193, Air Products and Chemicals, Inc., Allentown Pa.) and amine (DABCO® 33LV), and promoter (NIAX*™ A1, Momentive Performance Materials Inc., Columbus, Ohio) and stirred at 3100 rpm for 1 min. LUPRANATE® M20S (BASF, Florham Park, N.J.) was added and the mixture was stirred at 3100 rpm for 6 sec. The mixture was poured into an open cake box (6"×6"×3"). The resulting alkoxylated bio-oil polyurethane foam with a compression strength of 213 psi and a density of 2.43. A corrected deviation from a standard was determined to be 58 psi. The corrected deviation from a standard is the compressive strength difference from density corrected reference foam. The correction deviation from a standard may be calculated by taking the sample foam compressive strength and subtracting the reference foam compressive strength at the sample foam density as determined by linear extrapolation (see FIG. 6 for reference foam densities vs compressive strength correlations).

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. To the extent that the term "substantially" is used in the specification or the claims, it is intended to mean that the identified components have the relation or qualities indicated with degree of error as would be acceptable in the subject industry.

As used in the specification and the claims, the singular forms "a," "an," and "the" include the plural unless the singular is expressly specified. For example, reference to "a compound" may include a mixture of two or more compounds, as well as a single compound.

As used herein, the term "about" in conjunction with a number is intended to include ±10% of the number. In other words, "about 10" may mean from 9 to 11.

As used herein, the terms "optional" and "optionally" mean that the subsequently described circumstance may or may not occur, so that the description includes instances where the circumstance occurs and instances where it does not.

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, and the like. As a non-limiting example, each range discussed herein can be readily broken down into a lower third, middle third and upper third, and the like. As will also be understood by one skilled in the art all language such as "up to," "at least," "greater than," "less than," include the number recited and refer to ranges which can be subsequently broken down into sub-ranges as discussed above. Finally, as will be understood by one skilled in the art, a range includes each individual member. For example, a group having 1-3 cells refers to groups having 1, 2, or 3 cells. Similarly, a group having 1-5 cells refers to groups having 1, 2, 3, 4, or 5 cells, and so forth. While various aspects and embodiments have been disclosed herein, other aspects and embodiments will be apparent to those skilled in the art.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

As used herein, "substituted" refers to an organic group as defined below (e.g., an alkyl group) in which one or more bonds to a hydrogen atom contained therein may be replaced by a bond to non-hydrogen or non-carbon atoms. Substituted groups also include groups in which one or more bonds to a carbon(s) or hydrogen(s) atom may be replaced by one or more bonds, including double or triple bonds, to a heteroatom. A substituted group may be substituted with one or more substituents, unless otherwise specified. In some embodiments, a substituted group may be substituted with 1, 2, 3, 4, 5, or 6 substituents. Examples of substituent groups include: halogens (F, Cl, Br, and I); hydroxyls; alkoxy, alkenoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; or nitriles. A "per"-substituted compound or group is a compound or group having all or substantially all substitutable positions substituted with the indicated substituent. For example, 1,6-diiodo perfluoro hexane indicates a compound of formula $C_6F_{12}I_2$, where all the substitutable hydrogens have been replaced with fluorine atoms.

Substituted ring groups such as substituted cycloalkyl, aryl, heterocyclyl and heteroaryl groups also include rings and ring systems in which a bond to a hydrogen atom may be replaced with a bond to a carbon atom. Substituted cycloalkyl, aryl, heterocyclyl and heteroaryl groups may also be substituted with substituted or unsubstituted alkyl, alkenyl, and alkynyl groups as defined below.

Alkyl groups include straight chain and branched chain alkyl groups having from 1 to 12 carbon atoms, and typically from 1 to 10 carbons or, in some examples, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above and include, without limitation, haloalkyl (e.g., trifluoromethyl), hydroxyalkyl, thioalkyl, aminoalkyl, alkylaminoalkyl, dialkylaminoalkyl, alkoxyalkyl, or carboxyalkyl.

Cycloalkyl groups include mono-, bi- or tricyclic alkyl groups having from 3 to 12 carbon atoms in the ring(s), or, in some embodiments, 3 to 10, 3 to 8, or 3 to 4, 5, or 6 carbon atoms. Exemplary monocyclic cycloalkyl groups include, but are not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments, the number of ring carbon atoms ranges from 3 to 5, 3 to 6, or 3 to 7. Bi- and tricyclic ring systems include both bridged cycloalkyl groups and fused rings, such as, but not limited to, bicyclo[2.1.1] hexane, adamantyl, or decalinyl. Substituted cycloalkyl groups may be substituted one or more times with non-hydrogen and non-carbon groups as defined above. However, substituted cycloalkyl groups also include rings that may be substituted with straight or branched chain alkyl groups as defined above. Representative substituted cycloalkyl groups may be mono-substituted or substituted more than once, such as, but not limited to, 2,2-, 2,3-, 2,4-2,5- or 2,6-disubstituted cyclohexyl groups, which may be substituted with substituents such as those listed above.

Aryl groups may be cyclic aromatic hydrocarbons that do not contain heteroatoms. Aryl groups herein include monocyclic, bicyclic and tricyclic ring systems. Aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. In some embodiments, the aryl groups may be phenyl or naphthyl. Although the phrase "aryl groups" may include groups containing fused rings, such as fused aromatic-aliphatic ring systems (e.g., indanyl or tetrahydronaphthyl), "aryl groups" does not include aryl groups that have other groups, such as alkyl or halo groups, bonded to one of the ring members. Rather, groups such as tolyl may be referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl, which may be substituted with substituents such as those above.

Aralkyl groups may be alkyl groups as defined above in which a hydrogen or carbon bond of an alkyl group may be replaced with a bond to an aryl group as defined above. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanylethyl. Substituted aralkyls may be substituted one or more times with substituents as listed above.

Groups described herein having two or more points of attachment (e.g., divalent, trivalent, or polyvalent) within the compound of the technology may be designated by use of the suffix, "ene." For example, divalent alkyl groups may be alkylene groups, divalent aryl groups may be arylene groups, divalent heteroaryl groups may be heteroarylene groups, and so forth. In particular, certain polymers may be described by use of the suffix "ene" in conjunction with a term describing the polymer repeat unit.

Alkoxy groups may be hydroxyl groups (—OH) in which the bond to the hydrogen atom may be replaced by a bond to a carbon atom of a substituted or unsubstituted alkyl group as defined above. Examples of linear alkoxy groups include, but are not limited to, methoxy, ethoxy, propoxy, butoxy, pentoxy, or hexoxy. Examples of branched alkoxy groups include, but are not limited to, isopropoxy, sec-butoxy, tert-butoxy, isopentoxy, or isohexoxy. Examples of cycloalkoxy groups include, but are not limited to, cyclopropyloxy, cyclobutyloxy, cyclopentyloxy, or cyclohexyloxy. Representative substituted alkoxy groups may be substituted one or more times with substituents such as those listed above.

The term "amine" (or "amino"), as used herein, refers to $NR_5R_6$ groups, wherein $R_5$ and $R_6$ may be independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine may be alkylamino, dialkylamino, arylamino, or alkylarylamino. In other embodiments, the amine may be $NH_2$, methylamino, dimethylamino, ethylamino, diethylamino, propylamino, isopropylamino, phenylamino, or benzylamino. The term "alkylamino" may be defined as $NR_7R_8$, wherein at least one of $R_7$ and $R_8$ may be alkyl and the other may be alkyl or hydrogen. The term "arylamino" may be defined as $NR^9R^{10}$, wherein at least one of $R^9$ and $R^{10}$ may be aryl and the other may be aryl or hydrogen.

The term "halogen" or "halo," as used herein, refers to bromine, chlorine, fluorine, or iodine. In some embodiments, the halogen may be fluorine. In other embodiments, the halogen may be chlorine or bromine.

The various aspects and embodiments disclosed herein are for purposes of illustration and are not intended to be limiting, with the true scope and spirit being indicated by the following claims.

The invention claimed is:

1. A copolymer composition, comprising:
   a copolymer comprising:
   an alkoxylated bio-oil unit, the alkoxylated bio-oil unit derived from an alkoxylated bio-oil composition comprising an alkoxylated bio-oil having a hydroxyl value of at least 415; and
   a cross-linking unit, the cross-linking unit derived from a crosslinking reagent and effective to crosslink more than one alkoxylated bio-oil unit to form the copolymer
   wherein the alkoxylated bio-oil is derived from direct alkoxylation of a dewatered bio-oil using an alkoxylation reagent consisting of: an epoxide and a cyclic carbonate in the presence of a promoter, the dewatered bio-oil is obtained by dewatering a bio-oil, and further wherein the bio-oil is obtained from the pyrolysis of wood or other lignocellulosic-containing biomass.

2. The copolymer composition of claim 1, the copolymer comprising one or more of: a polyurethane, a polyester, a phenol-formaldehyde resin, a phenol-urea-formaldehyde resin, a phenol-formaldehyde resin, a phenol-formaldehyde-urea resin, and a urea-formaldehyde resin.

3. The copolymer composition of claim 1, the cross-linking unit derived from a crosslinking reagent characterized by one of:
   (i) a crosslinking reagent comprising at least two isocyanate groups;
   (ii) a crosslinking reagent comprising at least two carboxylic acid derivative groups, the at least two carboxylic acid derivative groups comprising one or more of: a carboxylic acid, an ester, an acyl halide, an anhydride, and a cyclic anhydride;
   (iii) a crosslinking reagent comprising a phenol compound substituted at an aryl carbon with a 1-hydroxyalkyl group;
   (iv) a crosslinking reagent derived from a product of an in situ reaction of a phenol compound and one or more of: formaldehyde, acetaldehyde, propionaldehyde, butryaldehyde, valeraldehyde, benzaldehyde, glyoxal, propane-1,3-dial, butane-1,4-dial, and glutaraldehyde, acetone, 2-butanone, 2-pentanone, 3-pentanone, butane-2,3-dione, and pentane-2,4-dione;
   (v) a crosslinking reagent derived from a product of an in situ reaction of a phenol compound, urea or a substituted urea, and one or more of: formaldehyde, acetaldehyde, propionaldehyde, butryaldehyde, valeraldehyde, benzaldehyde, glyoxal, propane-1,3-dial, butane-1,4-dial, and glutaraldehyde, acetone, 2-butanone, 2-pentanone, 3-pentanone, butane-2,3-dione, and pentane-2,4-dione; and
   (vi) a crosslinking reagent derived from a product of an in situ reaction of urea or a substituted urea, and one or more of: formaldehyde, acetaldehyde, propionaldehyde, butryaldehyde, valeraldehyde, benzaldehyde, glyoxal, propane-1,3-dial, butane-1,4-dial, and glutaraldehyde, acetone, 2-butanone, 2-pentanone, 3-pentanone, butane-2,3-dione, and pentane-2,4-dione.

4. The copolymer composition of claim 1, configured as one or more of: a foam, a spray foam, an extrusion, an injection molding, a coating, an adhesive, an elastomer, a foundry resin, a sealant, a casting, a fiber, a potting compound, a reaction injection molded (RIM) plastic, a microcellular elastomer or foam, and an integral skin foam.

5. The copolymer composition of claim 1, further comprising an amount of one or more of a free alkylene glycol and a crosslinked polyalkylene glycol in less than about 10 wt % compared to an amount of the copolymer, wherein the free alkylene glycol is formed as a result of a reaction between remaining water content in the dewatered bio-oil and the alkoxylation reagent.

6. The copolymer composition of claim 1, further comprising an amount of one or more of a free alkylene glycol and a crosslinked polyalkylene glycol in less than about 40 wt %, wherein the free alkylene glycol is formed as a result of a reaction between remaining water content in the dewatered bio-oil and the alkoxylation reagent.

7. The copolymer composition of claim 1, wherein the alkoxylated bio-oil is produced from a dewatered bio-oil, the dewatered bio-oil comprising water in less than about 3 wt % compared to the amount of dewatered bio-oil.

8. The copolymer composition of claim 7, the alkoxylated bio-oil produced from the dewatered bio-oil, the dewatered bio-oil comprising water of less than about 30 wt %.

9. The copolymer composition of claim 1, wherein the alkoxylated bio-oil has a hydroxyl value from 415 to 584.

10. A method for preparing a copolymer composition, the method comprising:
providing a polymerization precursor mixture, the polymerization precursor mixture comprising a crosslinking reagent configured to form a copolymer in combination with an alkoxylated bio-oil having a hydroxyl value of at least 415, wherein the alkoxylated bio-oil is derived from direct alkoxylation of a dewatered bio-oil using an alkoxylation reagent consisting one of: an epoxide and a cyclic carbonate in a presence of a promoter, the dewatered bio-oil is obtained by dewatering a bio-oil, and further wherein the bio-oil is obtained from pyrolysis of wood or other lignocellulosic-containing biomass; and
reacting an alkoxylated bio-oil composition comprising the alkoxylated bio-oil with the polymerization precursor mixture under reaction conditions effective to form the copolymer composition, wherein the cross-linking agent in the precursor mixture is derived from a cross-linking reagent and effective to crosslink the alkoxylated bio-oil to form the copolymer.

11. The method of claim 10, the alkoxylated bio-oil characterized by one or more of:
the dewatered bio-oil comprising a pyrolytic bio-oil or a catalytic pyrolytic bio-oil;
comprising at least one polyalkylene glycol unit covalently bound to one or more of an acid, an alcohol, and a phenol functionality originated in the dewatered bio-oil; and
in comparison to the dewatered bio-oil, by one or more of: a reduced viscosity, an increased molecular weight, a lower gel permeation chromatography retention time, and a reduced hydroxyl value of at least 415.

12. The method of claim 10, the crosslinking reagent comprising one of:
at least two isocyanate groups;
at least two carboxylic acid derivative groups;
one or more of: a carboxylic acid, an ester, a acyl halide, a cyclic anhydride, and an anhydride; and
a phenol compound substituted at an aryl carbon with at least one —$CR^1R^2OH$, wherein: $R^1$ is H, $CH_3$, $CH_2CH_3$, $CH_2CH_2CH_3$, $CH_2CH_2CH_2CH_3$, $C_6H_5$, CHO, CHO, $CH_2CHO$, $CH_2CH_2CHO$, $CH_2CH_2CH_2CHO$, $C(O)CH_3$, or $CH_2C(O)CH_3$; and $R^2$ is H, $CH_3$, $CH_2CH_3$, $CH_2CH_2CH_3$, $CH_2CH_2CH_2CH_3$, $C_6H_5$, CHO, CHO, $CH_2CHO$, $CH_2CH_2CHO$, $CH_2CH_2CH_2CHO$, $C(O)CH_3$, or $CH_2C(O)CH_3$.

13. The method of claim 10, the polymerization precursor comprising one of:
(i) one or more of: toluene diisocyanate, methylene diphenyl diisocyanate, 1,6-hexamethylene diisocyanate, 1-isocyanato-3-isocyanatomethyl-3,5,5-trimethyl-cyclohexane, and 4,4'-diisocyanato dicyclohexylmethane;
(ii) one or more of: a petroleum polyol, a bio-based polyester polyol, a foam forming surfactant, a trialkylamine, a polyalkylamino alkyl ether, an alkanol amine, a promoter, an antioxidant, a flame-retardant, an ultraviolet light stabilizer, a pigment, a dye, and a plasticizer;
(iii) one or more of: formaldehyde, acetaldehyde, propionaldehyde, butryaldehyde, valeraldehyde, glutaraldehyde glyoxal, benzaldehyde, propane-1,3-dial, butane-1,4-dial, acetone, 2-butanone, 2-pentanone, 3-pentanone, butane-2,3-dione, and pentane-2,4-dione;
(iv) a phenol compound, a urea or a substituted urea, and one or more of: formaldehyde, acetaldehyde, propionaldehyde, butryaldehyde, valeraldehyde, glutaraldehyde glyoxal, benzaldehyde, propane-1,3-dial, butane-1,4-dial, acetone, 2-butanone, 2-pentanone, 3-pentanone, butane-2,3-dione, and pentane-2,4-dione;
(v) a urea or substituted urea and one or more of: formaldehyde, acetaldehyde, propionaldehyde, butryaldehyde, valeraldehyde, glutaraldehyde glyoxal, benzaldehyde, propane-1,3-dial, butane-1,4-dial, acetone, 2-butanone, 2-pentanone, 3-pentanone, butane-2,3-dione, and pentane-2,4-dione; and
(vi) a phenol-formaldehyde resin.

14. The method of claim 10, further comprising contacting a viscosity-reducing modifier to one or more of the alkoxylated bio-oil and the polymerization precursor mixture.

15. The method of claim 10,
the polymerization precursor mixture comprising a phenol compound and one or more of an aldehyde and a ketone;
the aldehyde comprising one or more of: formaldehyde, acetaldehyde, propionaldehyde, butryaldehyde, valeraldehyde, benzaldehyde, glyoxal, propane-1,3-dial, butane-1,4-dial, and glutaraldehyde; and
the ketone comprising one or more of: acetone, 2-butanone, 2-pentanone, 3-pentanone, butane-2,3-dione, and pentane-2,4-dione,
wherein:
the phenol compound and one or more of the aldehyde and the ketone react to form a crosslinking agent comprising a phenol substituted at an aryl carbon with one or more of: —RCHOH and —$CR^1R^2OH$;
R is H, $CH_3$, $CH_2CH_3$, $CH_2CH_2CH_3$, $CH_2CH_2CH_2CH_3$, $C_6H_5$, CHO, $CH_2CHO$, $CH_2CH_2CHO$, or $CH_2CH_2CH_2CHO$; and
$R^1$ is $CH_3$, $CH_2CH_3$, $CH_2CH_2CH_3$, $CH_2CH_2CH_2CH_3$, $C_6H_5$, $C(O)CH_3$, or $CH_2C(O)CH_3$;
and $R^2$ is $CH_3$, $CH_2CH_3$, $CH_2CH_2CH_3$, $CH_2CH_2CH_2CH_3$, $C_6H_5$, $C(O)CH_3$, or $CH_2C(O)CH_3$.

16. The method of claim 10, the copolymer comprising one or more of: a phenol-formaldehyde resin; a phenol-urea-formaldehyde resin, a urea-formaldehyde resin, a polyester, and a polyurethane.

* * * * *